(12) United States Patent
Choi et al.

(10) Patent No.: US 7,092,201 B2
(45) Date of Patent: Aug. 15, 2006

(54) TAPE DECK MECHANISM WITH MAIN CAM GEAR MOVING SUB-DECK, POLE BASE LOADING UNIT, BRAKE UNIT AND MAIN SLIDING MEMEBER

(75) Inventors: Do-Young Choi, Suwon (KR); Jeong-Hyeob Oh, Anyang (KR); Jun-Young Kim, Suwon (KR); Jae-Kab Seo, Suwon (KR); Jae-Hoon Sim, Suwon (KR); Bong-Joo Kim, Suwon (KR); Myoung-Joon Kim, Suwon (KR); Byeng-Bae Park, Ansan (KR); Young-Ho Cho, Suwon (KR); Hyeong-Seok Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 115 days.

(21) Appl. No.: 10/661,559

(22) Filed: Sep. 15, 2003

(65) Prior Publication Data
US 2004/0062170 A1    Apr. 1, 2004

(30) Foreign Application Priority Data

| Sep. 16, 2002 | (KR) | ............... 10-2002-0056258 |
| Oct. 12, 2002 | (KR) | ............... 10-2002-0062305 |
| Oct. 16, 2002 | (KR) | ............... 20-2002-0030823 |
| Nov. 5, 2002 | (KR) | ............... 10-2002-0068072 |
| Dec. 2, 2002 | (KR) | ............... 10-2002-0075933 |
| Dec. 9, 2002 | (KR) | ............... 10-2002-0077848 |
| Dec. 31, 2002 | (KR) | ............... 10-2002-0088236 |
| Feb. 8, 2003 | (KR) | ............... 10-2003-0008021 |
| Feb. 14, 2003 | (KR) | ............... 10-2003-0009515 |
| Feb. 27, 2003 | (KR) | ............... 10-2003-0012333 |

(51) Int. Cl.
  *G11B 15/61*    (2006.01)
  *G11B 15/665*   (2006.01)
  *G11B 15/28*    (2006.01)

(52) U.S. Cl. ............... 360/85; 360/95; 242/335

(58) Field of Classification Search ............... 360/85, 360/95; 242/335, 338, 338.1, 338.4, 340
See application file for complete search history.

(56) References Cited

U.S. PATENT DOCUMENTS

| 5,485,324 | A | * | 1/1996 | Do et al. ............... 360/85 |
| 5,699,208 | A | * | 12/1997 | Kim et al. ............... 360/85 |
| 5,943,181 | A | | 8/1999 | Son et al. |
| 6,215,612 | B1 | * | 4/2001 | Saito et al. ............... 360/85 |
| 6,449,118 | B1 | | 9/2002 | Choi et al. |

FOREIGN PATENT DOCUMENTS

| JP | 09-050690 | 2/1997 |
| JP | 10-106078 | 4/1998 |
| JP | 2000-322789 | 11/2000 |
| JP | 2001-250299 | 9/2001 |
| KR | 95-2290 | 3/1995 |

* cited by examiner

*Primary Examiner*—Craig A. Renner
(74) *Attorney, Agent, or Firm*—Roylance, Abrams, Berdo & Goodman, L.L.P.

(57) ABSTRACT

A deck mechanism for a magnetic recording/reproducing apparatus comprises a main deck provided with a head drum, a capstan motor, and a sub-deck installed on the main deck to be loaded/unloaded. The sub-deck is provided with a pair of reel discs, onto which tape reels of a tape cassette are seated; a pole base loading unit; a pinch roller unit for compressing the tape against a spindle of the capstan motor when the sub-deck is loaded; a brake unit; a main sliding member mounted on the main deck to be capable of reciprocatingly sliding, the main sliding member controlling the driving of the pinch roller unit; and a main cam gear mounted on the main deck. The main cam gear causes the sub-deck, the pole base loading unit, the brake unit, and the main sliding member to perform linked movements while the main cam gear is rotationally driven.

23 Claims, 36 Drawing Sheets

TAPE DECK MECHANISM WITH MAIN CAM GEAR MOVING SUB-DECK, POLE BASE LOADING UNIT, BRAKE UNIT AND MAIN SLIDING MEMEBER

This application claims benefit under 35 U.S.C. § 119 from Korean Patent Application No. 2002-56258, filed on Sep. 16, 2002, No. 2002-62305, filed on Oct. 12, 2002, No. 2002-88236, filed on Dec. 31, 2002, No. 2002-75933, filed on Dec. 2, 2002, No. 2002-77848, filed on Dec. 9, 2002, No. 2002-68072, filed on Nov. 5, 2002, No. 2003-8021, filed on Feb. 8, 2003, No. 2003-9515, filed on Feb. 14, 2003, No. 2003-12333, filed on Feb. 27, 2003, and Korean Utility Model Application No. 2002-30823, filed Oct. 16, 2002, all of which are incorporated herein by reference in their entirety.

BACKGROUND

1. Field of the Invention

The present invention relates to a magnetic recording/reproducing apparatus, and in particular to a deck mechanism for a magnetic recording/reproducing apparatus, and is particularly concerned with tape cassette loading and tape loading.

2. Description of the Related Art

In general, a magnetic recording/reproducing apparatus is used to record information on a recording medium such as a magnetic tape and to reproduce recorded information. Such a magnetic recording/reproducing apparatus includes, for example, a VCR (video cassette tape recorder), a camcorder and the like.

A deck mechanism employed in the magnetic recording/reproducing apparatus as mentioned above comprises: cassette loading means for moving a tape cassette into a predetermined position; tape loading means for taking out a magnetic tape from a cassette as being loaded; a tape guide means for supporting and guiding the taken-out magnetic tape with a predetermined tension; two tables, on which the tape reels of the cassette tape are seated; a brake unit for selectively braking the tables; and a pinch roller unit for making the tape sandwiched between a capstan and a pinch roller.

The deck mechanism with above-mentioned construction is typically driven in accordance with a control program and performs various functions such as recording/reproducing of information, fast forward, rewind, high-speed forward and backward search, and so on, by the composite driving of the individual components thereof.

In order to follow the recent tendency that magnetic recording/reproducing apparatuses such as camcorders are light-weighted, thinned, simplified and small-sized, there is a need to improve a magnetic recording/reproducing apparatus in such a way that individual components and the connective relationships therebetween are simplified, whereby the entire construction is simplified and the apparatus is capable of performing mechanically stable operation.

SUMMARY

Accordingly, the present invention has been made to solve the above-mentioned problems occurring in conventional systems. One object of the present invention is to provide an deck mechanism for a magnetic recording/reproducing apparatus, which is improved in such a way that the entire size is reduced, the construction is simplified and the deck mechanism is capable of mechanically stable operation.

In order to achieve the above object, according to embodiments of the present invention, there is provided a deck mechanism for a magnetic recording/reproducing apparatus, comprising: a main deck provided with a head drum and a capstan motor; a sub-deck installed on the main deck to be loaded/unloaded, the sub-deck being provided with a pair of reel discs, onto which tape reels of a tape cassette are seated, respectively; a pole base loading unit for taking out and guiding a tape to be in contact with a side of the head drum when the sub-deck is loaded; a pinch roller unit for compressing the tape against a spindle of the capstan motor when the sub-deck is loaded; a brake unit for selectively braking one of the roll discs; a main sliding member mounted on the main deck to be capable of reciprocatingly sliding, the main sliding member controlling the driving of the pinch roller unit; and a main cam gear mounted on the main deck to be capable of rotating, the main cam gear causing all of the sub-deck, the pole base loading unit, the brake unit, and the main sliding member to perform linked movements while the main cam gear is being rotationally driven.

The pole base loading unit preferably comprises: a pair of pole base assemblies mounted to be capable of reciprocating on the main deck, the pole base assemblies moving the tape while being loaded to come into contact with the head drum; a guide rail provided on the main deck and guiding the movement of the pole base assemblies; a pair of loading gears mounted on the guide rail capable of being rotated, the loading gears being engaged with each other and connected to the main cam gear; and a pair of link units for linking the loading gears to the pole base assemblies, respectively.

It is also preferable that at least one of the loading gears is integrally formed with a hook so that the at least one loading gear is directly joined to the guide rail.

The loading gears preferably comprise: a first loading gear fitted on the bottom side of the guide rail to be capable of being rotated; and a second loading gear fitted on the guide rail and provided with a first gear section engaged with the first loading gear and a second gear section connected to the main cam gear.

The second gear section is preferably formed in a position lower than the first gear section, so that a step is formed between the first and second gear sections, and the second gear section has a radius larger than that of the first gear section. The second gear section is preferably provided in such a way that gear teeth are formed to be projected from a predetermined area on the circumference of the second loading gear only, whereby the second gear section is engaged with the main cam gear only in the predetermined area.

In addition, a pair of large gear valleys, which are relatively deep as compared to the neighboring gear valleys, may be formed in the large gear section, the gear valley respectively positioned at the opposite ends thereof to start engagement with the main cam gear according to the rotating directions of the main cam gear, and a pair of large teeth, which are formed to be relatively highly projected as compared to neighboring gear teeth, are preferably formed in the main cam gear, the large teeth positioned to correspond to the large gear valleys. It is also preferable that the large gear teeth are formed in a position lower than the other gear teeth formed all over the circumference of the main cam gear.

The main cam gear preferably comprises: a main gear part formed all over the circumference to receive power; a connection gear part formed in a position lower than the main gear part to be connected with the gear teeth of the second gear section; a pair of large gear teeth each formed in the leading and trailing parts of the connection gear part, the large gear teeth being formed larger than the gear teeth of the connection gear part; and a sliding wing portion formed to be projected in a circular arc shape of a predetermined length in a place laid out from the connection gear part and the large gear teeth and lower than the main gear part and slidably contacted with the circumference of the second gear section.

In addition, it is preferable that the pinch roller unit comprises: a pivot lever rotatably mounted on the main deck and rotated toward the spindle of the capstan motor in cooperation with the sub-deck as being loaded; a pinch roller rotatably mounted on one end of the pivot lever and coming into close contact with the spindle of the capstan motor; and a torsion spring mounted on the pivot lever, the torsion spring urging the pivot lever against the spindle of the capstan motor which has been firstly pushed by the sub-deck, while the torsion spring is being pushed and compressed by the sliding member.

It is also preferable that one end of the torsion spring is downwardly bent toward the main sliding member side, and a compression projection is upwardly projected from the main sliding member to come into contact with and compress the one end of the torsion spring.

It is also preferable that when the torsion spring is loaded along with the pivot lever, the main sliding member is reciprocated for a predetermined distance one time so that it does not interfere with the movement of the torsion spring.

It is also preferable that when the loading of the torsion spring is completed, one end of the torsion spring is positioned in the moving area of the compression projection, so that the torsion spring is capable of being contacted with and compressed by the compression projection when the main sliding member moves.

Furthermore, it is preferable that the main cam gear is formed with a main cam slot in a predetermined length and shape, in which the main cam slot cause the main sliding member to be linked thereby controlling the reciprocation movements of the main sliding member.

It is also preferable that the main cam slot is formed on the bottom surface of the main cam gear.

In addition, it is preferable that the brake unit comprises: a first brake pivotally installed on the sub-deck, the first brake being contacted with and then spaced from the one reel disc; a spring for compressing the first brake to be contacted with the one reel disc; a second brake installed coaxial to the first brake, the second brake being rotated with the first brake in one direction, in which the first brake is spaced from the one reel disc, and being independently rotated in the other direction opposite to the one direction to come into contact with the one reel disc; and a torsion spring for compressing the second brake to be contacted with the one reel disc, wherein each of the first and second brakes is selectively contacted and linked with the main cam gear when the sub-deck is loaded, thereby being separated from/contacted with the one reel disc.

It is also preferable that the first and second brakes are formed with first and second guide pins projected from the bottom sides thereof, respectively, the first and second guide pins being contacted with and guided by the main cam gear.

It is also preferable that the main cam gear is provided with a guide slot for sequentially guiding the first and second guide pins in a predetermined area in the rotational direction of the main cam gear.

It is also preferable that the guide slot is formed in the predetermined area on the top surface of the main cam gear, and the first and second guide pins are sequentially entered in and spaced from the guide slot at the time of loading/unloading the first and second guide pins, thereby being selectively guided.

It is also preferable that the one reel disc is the supply side reel disk that is adjacent to the main cam gear.

In addition, it is preferable that the deck mechanism further comprises a reel cover, wherein the reel cover is installed on the top side of the sub-deck and supports the brake unit.

It is preferable that the sub-deck is formed with a cam slot in a predetermined shape and the cam slot is capable of cooperating with and moving a projection pin projected from the main cam gear at the time of loading/unloading the main cam gear.

In addition, it is preferable that the deck mechanism further comprises a mode switch for sensing various operation modes including the loading/unloading of the sub-deck, the mode switch being adapted to cooperate with the main cam gear.

It is also preferable that the mode switch comprises: an elastic brush installed under the main cam gear and provided with a plurality of contact pins; and an FPC provided with a mode-sensing pattern in a predetermined shape, in which the elastic brush is contacted with the mode-sensing pattern and the FPC faces the bottom surface of the cam gear.

It is also preferable that the bottom surface of the main cam gear is provided with an accommodation recess for accommodating and supporting the elastic brush.

Further, it is preferable that the main cam gear comprises: a disc-shaped body rotatably installed on the top surface of the main deck; gear teeth formed on the circumference of the body in a predetermined shape to cooperate with the pole base loading unit; a cam slot formed on the bottom surface of the body and cooperating with the main sliding member to reciprocate the main sliding member; a guide slot formed on the top surface of the body and cooperating with the brake unit to drive the brake unit; and a projection pin projected from the top surface of the body and cooperating with the sub-deck to load/unload the sub-deck.

BRIEF DESCRIPTION OF DRAWINGS

The above and other objects, features and advantages of the present invention will be more apparent from the following detailed description taken with reference to the accompanying drawing figures, in which.

Throughout the drawing figures, it will be understood that like numerals refer to like features and structures.

DETAILED DESCRIPTION OF THE PREFERRED EMBODIMENTS

Hereinbelow, a deck mechanism for a magnetic recording/reproducing apparatus according the preferred embodiments of the present invention will be described in detail with reference to the accompanying drawing figures.

Figure 1:
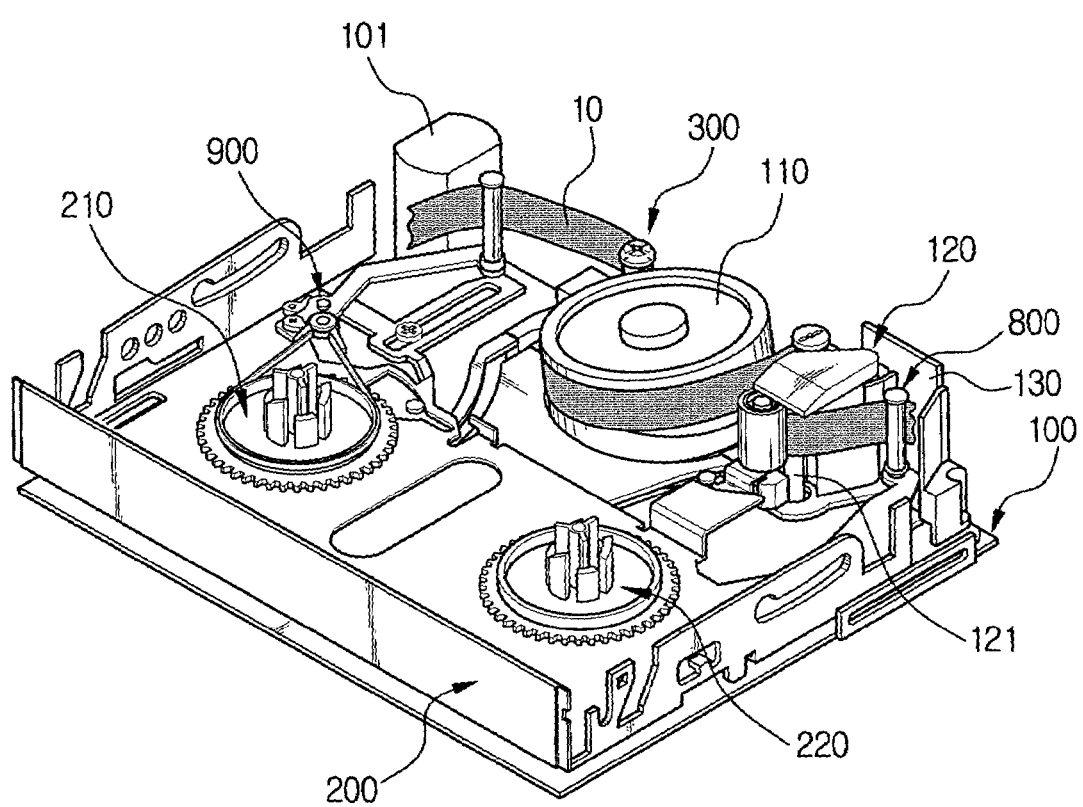
FIG. 1 is a perspective view showing the loaded state of the deck mechanism for a magnetic recording/reproducing apparatus according to an embodiment of the present invention.
Figure 2:
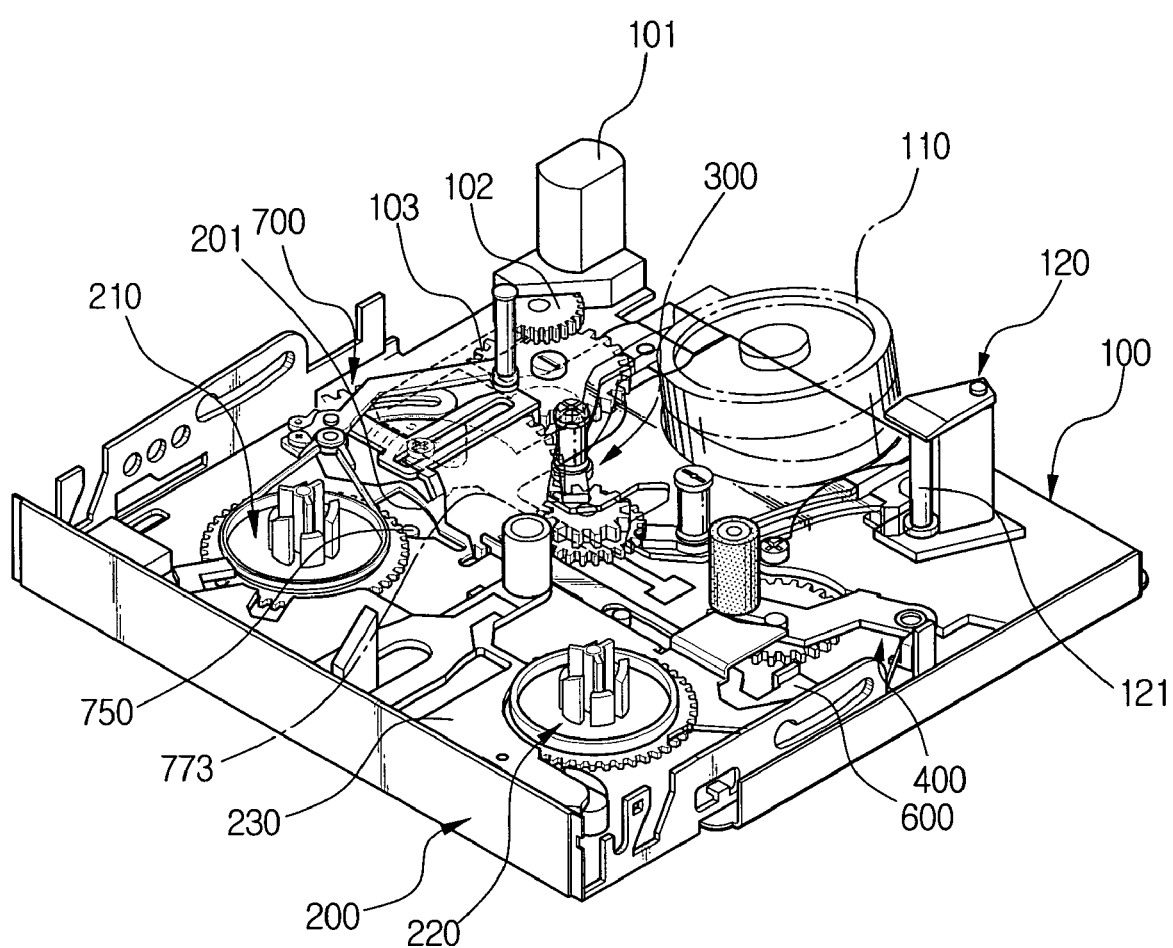
FIG. 2 is a perspective view showing the unloaded state of the deck mechanism for a magnetic recording/reproducing apparatus according to an embodiment of the present invention.

Referring to FIGS. 1 and 2, the deck mechanism for a magnetic recording/reproducing mechanism according to an embodiment of the present invention comprises a main deck 100 provided with a head drum 110 and a capstan motor 120; a sub-deck 200 installed on the main deck 100 to be capable of being loaded/unloaded; a pole base loading unit 300 that takes out a tape 10 from a tape cassette when the sub-deck is loaded in, so that the tape is allowed to run in contact with the head drum; a pinch roller unit 400 for causing the tape 10 taken out from the tape cassette to be contacted with and compressed against a spindle of the capstan motor 120; a brake unit 500 for offering any of a pair of reel discs 210, 220 provided on the sub-deck 200 into operation (see FIG. 13); a main sliding member 600 slidably mounted on the main deck 100; a main cam gear 700 for causing all of the sub-deck 200, the pole base loading unit 300, the brake unit 500 and the main sliding unit 600 to perform linked movements; a review arm unit 800, and a tension pole assembly 900.

The head drum 110 records information into or reproduces recorded information from the tape run in contact with the head drum while the head drum 110 performs high-speed rotation. The capstan motor 120 supplies power for rotationally driving each of the reel discs 210, 220. In addition, the spindle 121 of the capstan motor 120 is uprightly mounted on the main deck 100 to guide the tape as the tape is being run.

The main deck 100 is provided with a driving motor 101 for driving the main cam gear 700 to supply power required for moving various units 300, 400, 500 and 600 including the sub-deck 200. The power of the driving motor 101 is transferred to the main cam gear 700 via a plurality of connecting gears 102, 103.

The sub-deck 200 is mounted on the main deck 100 to be capable of being loaded/unloaded. The sub-deck 200 is formed with a cam slot 201 guided by a projection pin 750 extended from the top of the main cam gear 700. As a result, when the main cam gear 700 rotates, the cam slot 201 is guided by the projection pin 750, which enables the sub-deck 200 to be loaded/unloaded.

The sub-deck 200 is provided with the reel discs 210, 220. The reel discs 210, 220 are engaged with the tape reels of a tape cassette, respectively. In this case, the left reel disc 210 serves to feed the tape and is called as "supply disc," and the right reel disc 220 serves to wind the tape and is called as "takeup reel disc." A reel cover 230 is also provided on the top of the sub-deck 200. The reel cover 230 supports a reel brake unit 500 to be described in further detail below.

Figure 3:
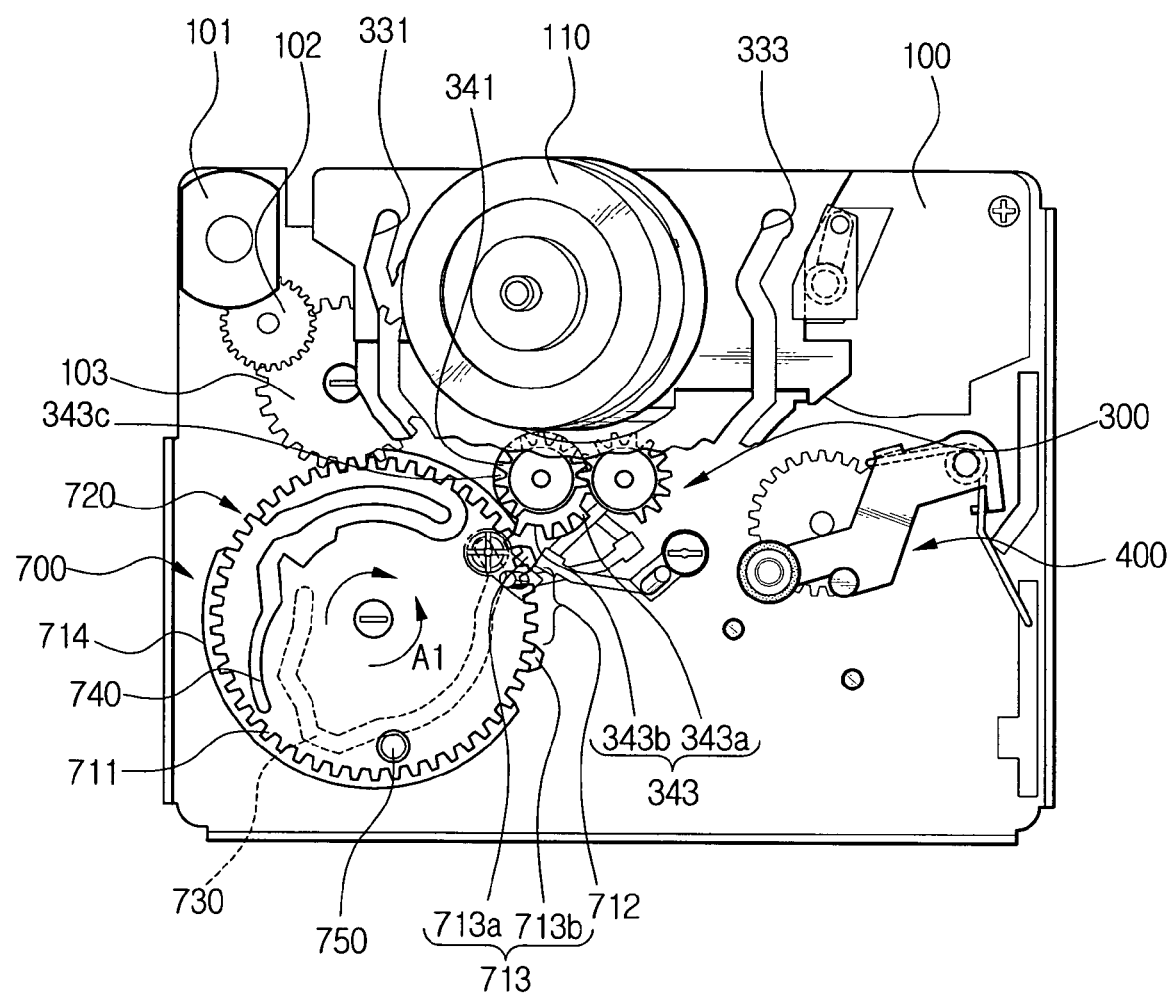
FIG. 3 is a top plan view showing the loaded state of the deck mechanism according to an embodiment of the present invention.
Figure 4:
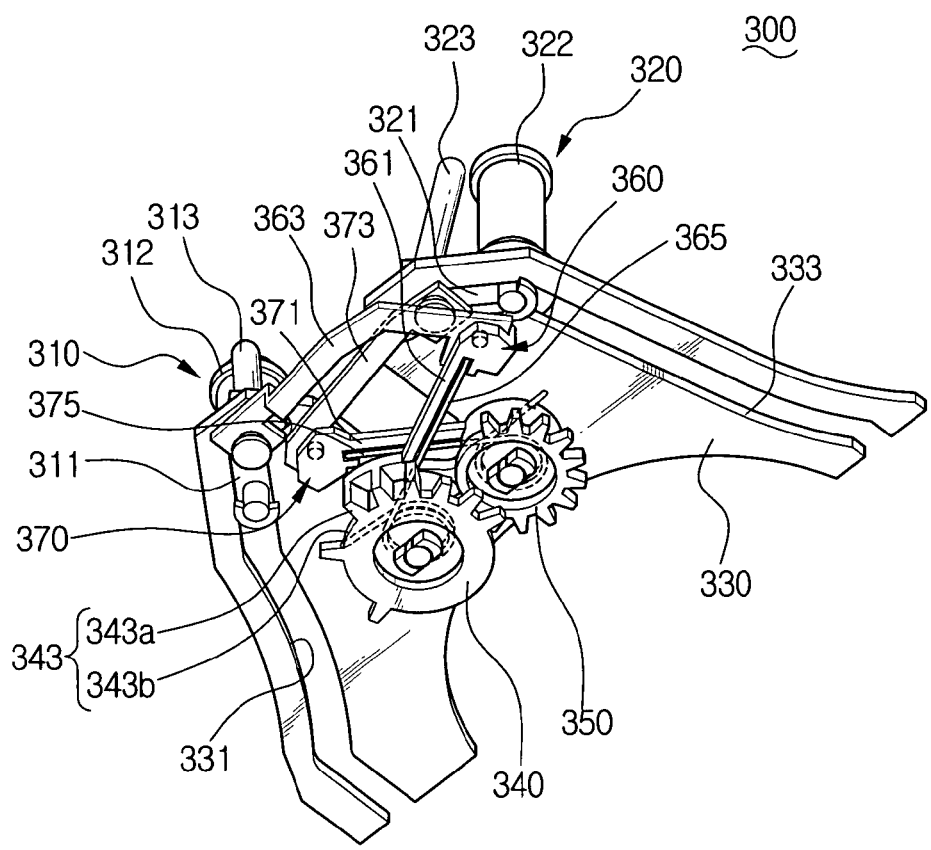
FIG. 4 is a perspective view showing the pole base loading unit shown in FIG. 3.
Figure 5:
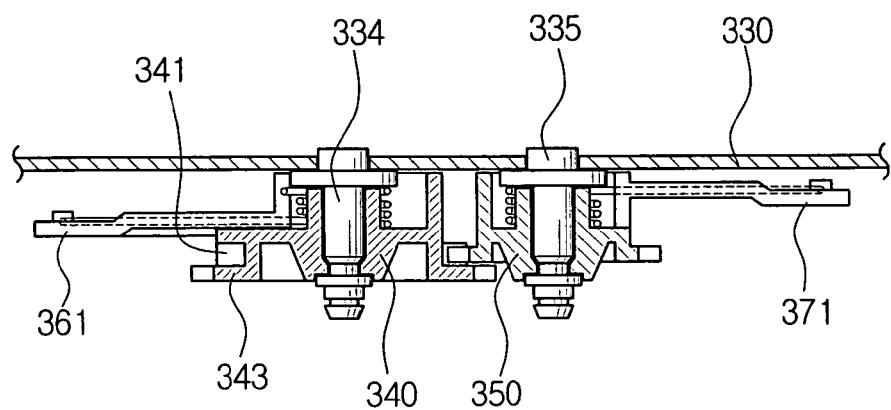
FIG. 5 is a cross-sectional view of a main part of FIG. 4.

Referring to FIGS. 3 to 5, the pole base loading unit 300 comprises a pair of pole base assemblies 310, 320 reciprocating on the main deck 100; a pair of guide rails 331, 333 provided on the main deck 100 to guide the movements of the pole base assemblies 310, 320; a pair of loading gears 340, 350; and a pair of link units 360, 370.

The pole base assemblies 310, 320 are reciprocated along the guide rails 331, 333, respectively. The pole base assemblies take out a tape from a cassette as being loaded and guides the tape so that the tape is in contact with the head drum 110 while being run. Each of the pole base assemblies 310, 320 a tape guide roller 312, 322 provided on a pole base 311, 321, and a guide pole 313; 323. This construction of the pole base assemblies 310, 320 is a conventionally employed one and the guide poles 313, 323 maybe omitted.

The guide rails 331, 333 are formed in a rail plate 330 mounted on the main deck 100. The rail plate 330 is formed of a steel sheet and capable of being connected to a drum base, on which the head drum 110 is mounted.

The loading gears, i.e., the first and second loading gears 340, 350 are rotatably mounted on the rail plate 330 and connected with each other. In addition, the first loading gear 340 is engaged with the main cam gear 700 to receive power from the main cam gear 700. The first loading gear 340 is connected to the pole base assembly 310 by way of the first link unit 360 and the second loading gear 350 is connected to the pole base assembly 320 by way of the second link unit 370. The first loading gear 340 comprises a first gear section 341 engaged with the second loading gear 350 and a second gear section 343 selectively engaged with the main cam gear 700. The first and second gear sections 341, 343 are provided in different heights in a stepped manner. That is, the first gear section 341 is preferably located higher than the second gear section 343. And, the first gear section 341 has a radius smaller that that of the second gear section 343.

Here, the second gear section 343 has gear teeth 343a formed in a predetermined area of the second gear section 343 in the circumferential direction so that the second gear section 343 is only engaged with the main cam gear 700 in the predetermined area. And, the opposite end portions of the gear teeth 343a are formed with relatively wide and deep gear valleys 343b for starting the engagement with the main cam gear 700. Further, the loading gears 340, 350 are rotatably fitted onto the stationary shafts 334, 335, respectively, which are fixed on the rail plate 330. It is preferable to use molds, which are easy to manufacture and low-priced, for the loading gears 340, 350.

Each of the first and second link units 360, 370 comprises a first link member 361; 371 connected to any of the loading gears 340, 350, a second link member 363; 373 for connecting the first link member 361; 371 to any of the pole base assemblies 310, 320. Here, the link members 361, 371 are integrally formed with the loading members 340, 350 in an elongate rod shape, respectively. And, the one ends of the first link members 361, 371 and the second link members 363, 373 are hingedly connected. That is, the first link members 361, 371 are formed to be projected from sides of the loading gears 340, 350, respectively, where by one ends of the first link members 361, 371 are fixed to the loading gears 340, 350, respectively and the other ends are hingedly connected to the second link members 363, 373, respectively. Such first links 361, 371 are preferably formed from a material capable of being bent by an external force and being returned to its original shape. Further, the second link members 363, 373 are hingedly connected to the pole bases 311, 321 at the other ends thereof, respectively.

Accordingly, each link member 361, 371 is capable of being bent, even if the second loading gear 340 is further rotationally driven in the loading direction when the pole base assembly 310, 320 come into contact with the terminal ends of the guide rails 331, 333 at the time of loading a magnetic tape.

Figure 6:
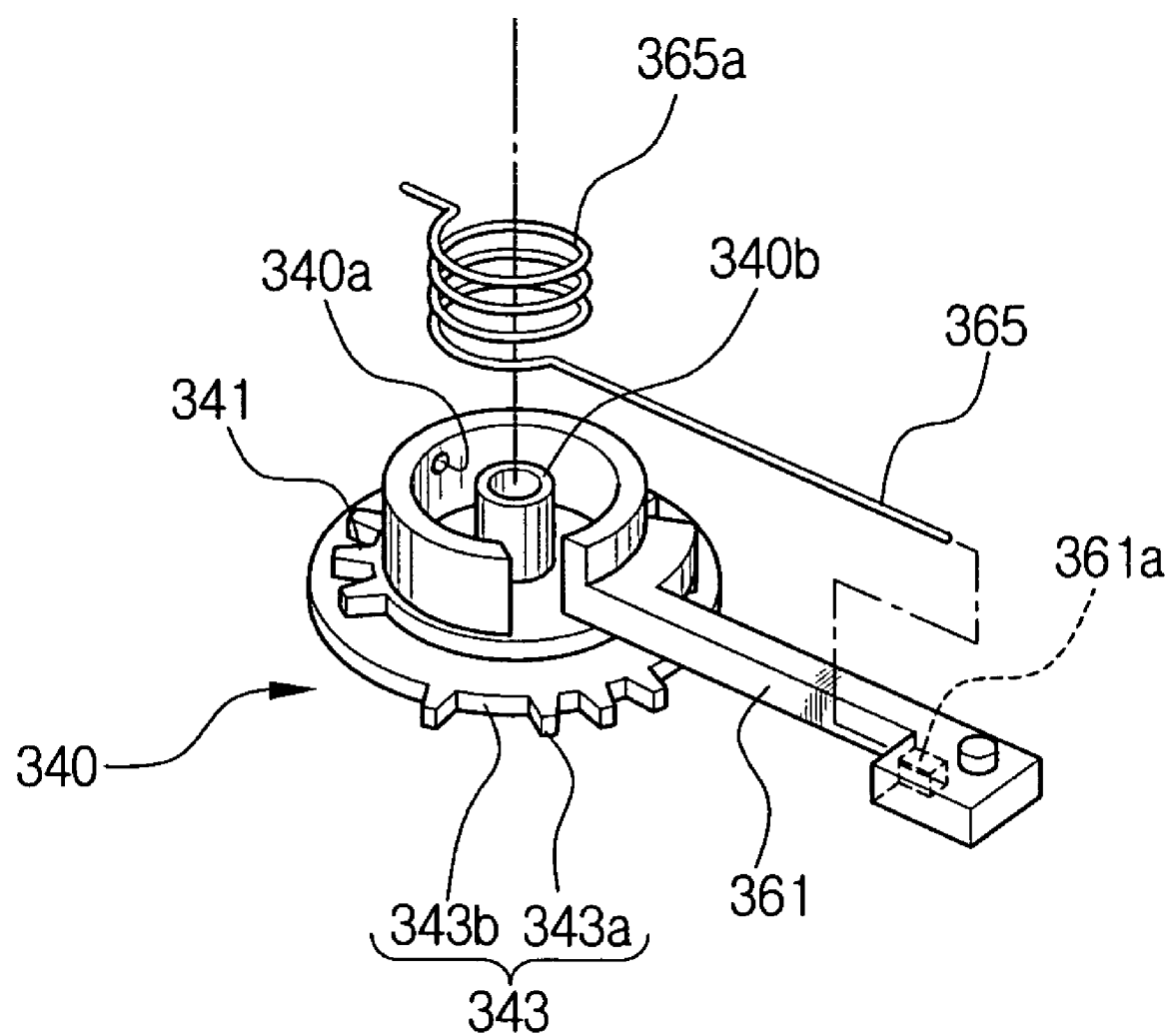
FIG. 6 is an exploded perspective view of the main part of FIG. 4.

The link members 361, 371 are preferably provided with iron cores 365, 375 as means for reinforcing elasticity for preventing plastic deformation of the link members 361, 371 due to over rotation of the first loading gear 340. Among them, considering the iron core 365 provided in the first link member 361 in reference to FIG. 6, one end of the iron core 365 is inserted into a mounting hole 361a formed in the first loading gear 361 and the other end is inserted into a mounting hole 340a formed in the first loading gear 340, whereby the first link member 361 and the first loading gear 340 are supported. The iron core 365 of this construction serves as a reinforcement means for the first link member 365 merely by securing one end in the circumference of the first loading gear 340 and the other end in the mounting hole 361a. In the present embodiment, a torsion spring 365a is additionally provided on the central axle 340b, to which the stationary shaft 334 is connected, in which the one end of the torsion spring 365a is extended to have a construction the same as that of the iron core 365. Here, the construction of the iron core 375 as mentioned above is also same with that of the iron core 365. According to this construction, it is possible to increase the elastic return force generated in the first link members 361, 371 as the first loading gear 340 is over-rotated at the time of loading the magnetic tape 10. Therefore, it is possible to prevent plastic deformation of the first link members 361, 371 while allowing the pole base assemblies 310, 320 to be in close contact with the terminal ends of the guide rails 331, 333.

Figure 7A:
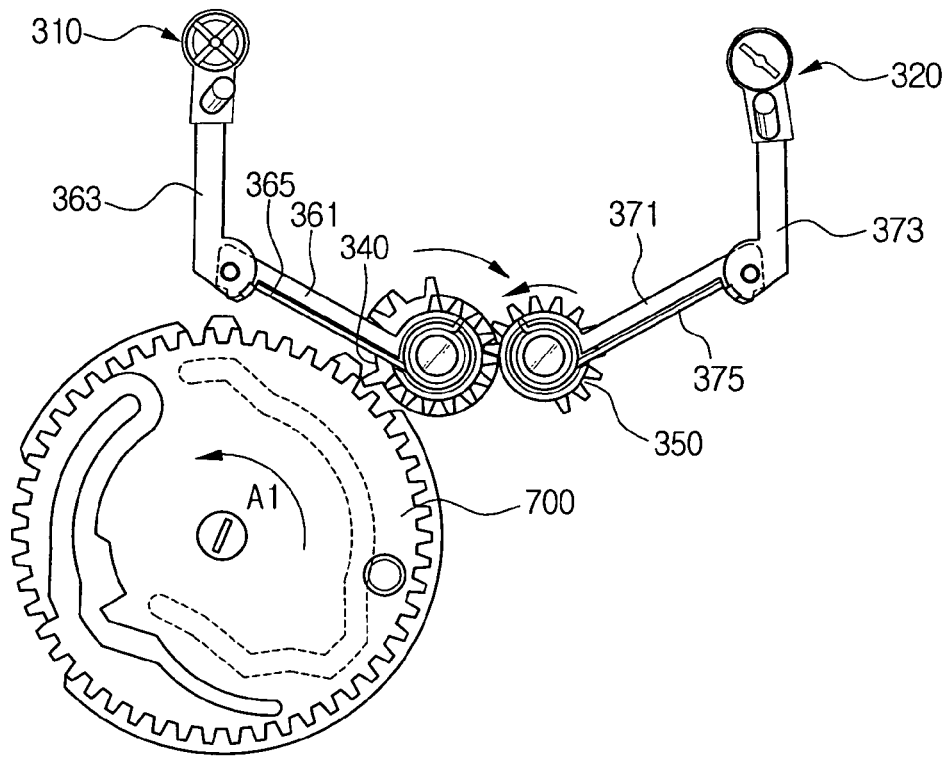
FIGS. 7A and 7B are schematic top plan views for illustrating the operating states of the loading unit shown in FIG. 4, respectively.
Figure 7B:
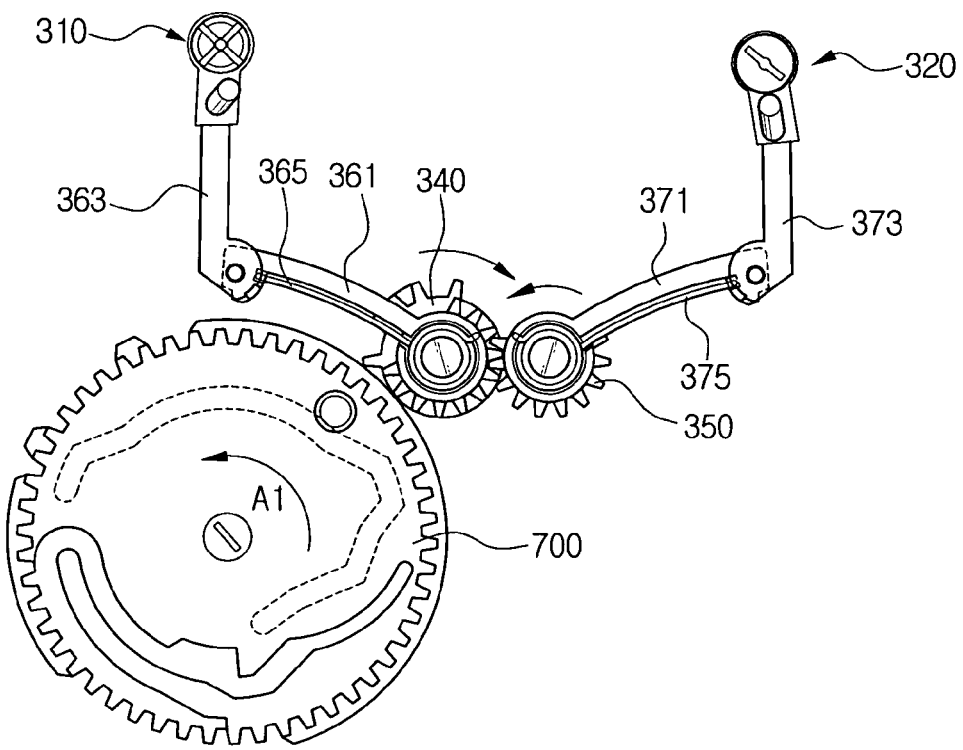

Considering more specifically with reference to FIGS. 7A and 7B, when the main cam gear 700 is rotationally driven by receiving the power of the driving motor 101 at the time of loading a magnetic tape, the first loading gear 340 is also rotationally driven. The second loading gear 350 is also rotated by being linked with the first loading gear 340. As each of the loading gears 340, 350 rotates, the first link members 361, 371 and the second link members 363, 373 are extended and the pole base assemblies 310, 320 are moved to the terminal ends of the guide rails 331, 333 in the head drum 110 side. When the pole base assemblies 310, 320 are moved along the guide rails 331, 333 and then come into contact with the terminal ends of the guide rails 331, 333 in the afore-mentioned manner, the assemblies 310, 320 cannot move in the tape loading direction any more. However, the main cam gear 700 is further rotationally driven by a predetermined rotational angle in order to render the pole base assemblies 310, 320 to be in tighter contact with the terminal ends of the guide rails 331, 333, whereby the first and second loading gears 340, 350 will be pushed in the state of being in contact with the main cam gear, and thus will additionally receive rotational force in the rotating direction.

In this manner, if the rotational force is additionally applied to each of the loading gears 340, 350, a load acts on the first link members 361, 371 and the iron cores 365, 375. Accordingly, the first links 361, 371 are elastically bent as shown in FIG. 7B, as a result of which they can render the guide rails 331, 333 to be more closely contact with the terminal ends of the guide rails 331, 333 and resiliently support the pole base assemblies. The same can be envisaged if the iron cores 365, 375 are removed and first link members 361, 371, which exert larger elastic restoring forces, are used.

Figure 8:
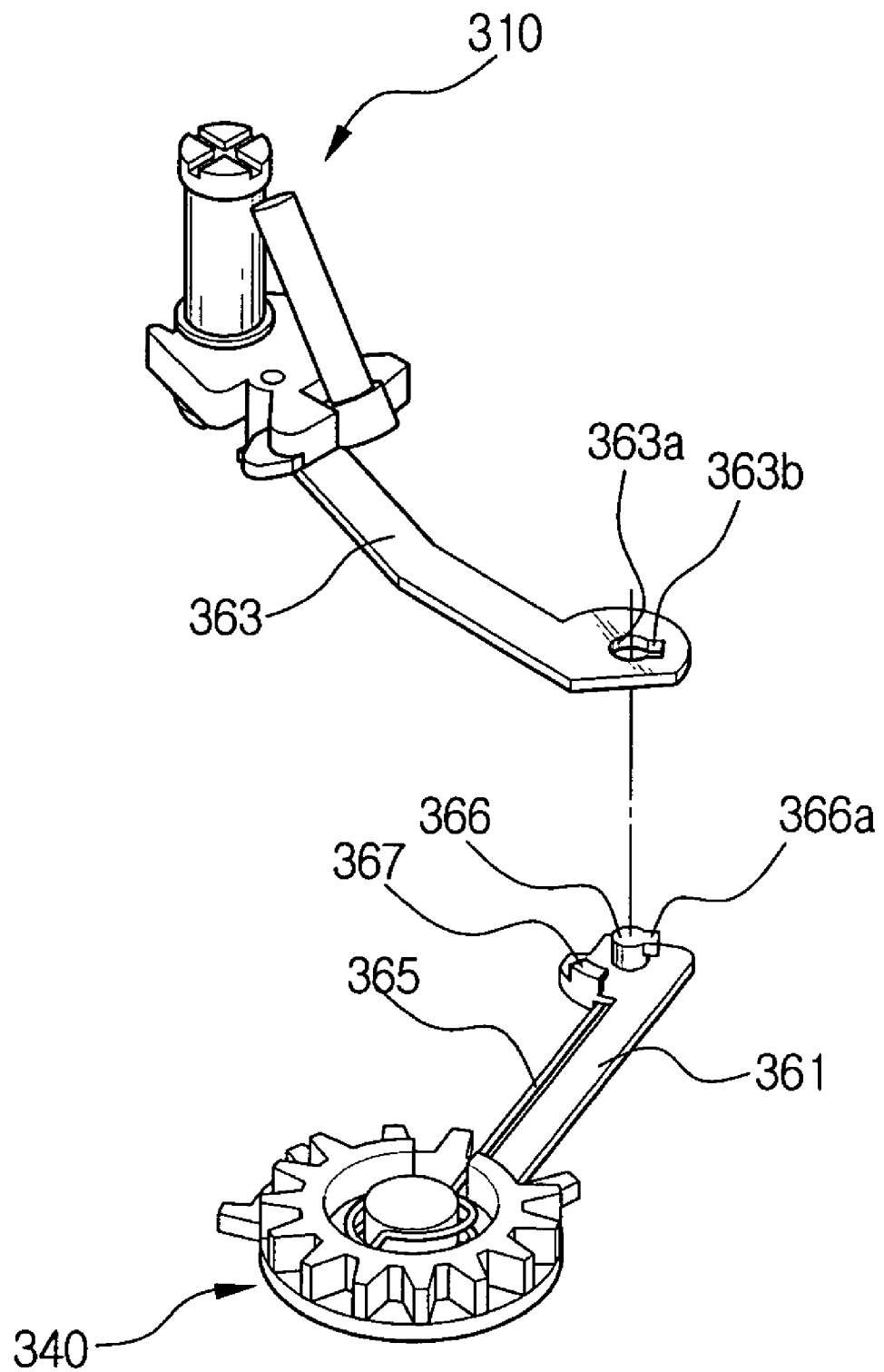
FIGS. 8 and 9 are perspectives views showing the loading unit of the pole base assembly according to another embodiment of the present invention.
Figure 9:
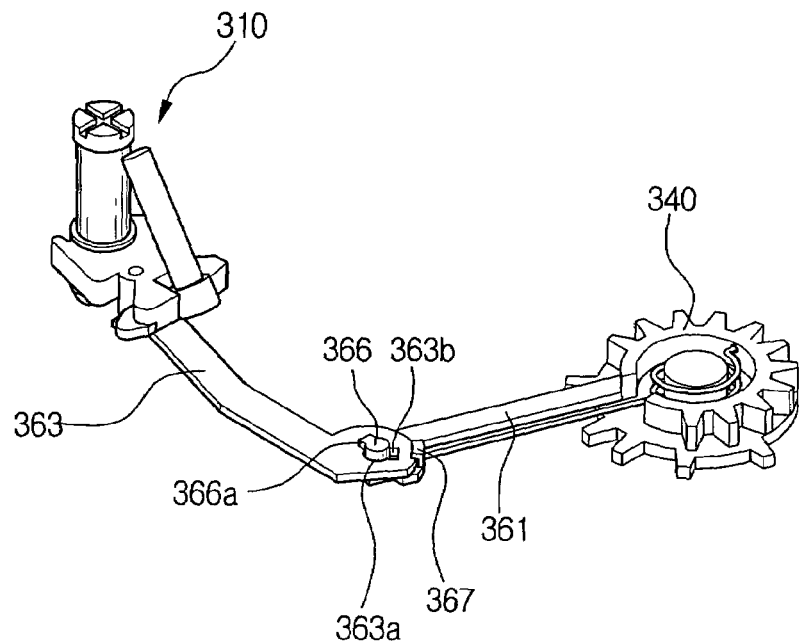

The hinged connection construction of the first link members 361, 371 and second link members 363, 373 will now be described in detail. In this embodiment, the first link member 361 and the second link member 363 is described by way of an example. Referring to FIGS. 8 and 9, a hinge projection 366 is projected from one end of the link member 361 and a hinge hole 363a corresponding to the hinge projection 366 is formed through one end of the second link member 363. The hinge projection 366 is integrally formed with the first link 361 and upwardly projected from the top surface of the first link member 361. In addition, a limit projection 367 is also upwardly projected from the top surface of the first link 361 in order to limit the relative rotating range between the first link member 361 and the second link member 363. According to this construction, the hinge projection 366 is inserted into the hinge hole 363a and rotatable by a predetermined angle. In this case, as a means for preventing the hinge projection 366 from being separated from the hinge hole 363a, there are further provided a separation prevention rib 366a eccentrically and projectedly formed on the top end of the hinge projection and a separation prevention groove 363b formed by cutting the inner periphery of the hinge hole 363a.

According to the above construction, the hinge projection 366 is inserted into the hinge hole 363a in the state where the direction of the separation prevention rib 366 of the first link member 261 is adjusted to face the separation prevention groove 363b. Then, if the respective link members 361, 363 are rotated so that the separation prevention rib 366a and the separation prevention groove 363b are not superposed with each other, as shown in FIG. 9, hinge connection of the respective link members 261, 363 is completed. In this state, the separation prevention rib 366a comes into contact with the top surface of the second link member 363 and restrains the vertical movement of the second link member 363, thereby preventing the separation of the first and second link members. In addition, in the state where the link members 361, 363 are connected, because the separation prevention rib 366a and the separation prevention groove 363b do not overlap with each other within the cooperative rotation range, the link members 361, 363 will not be separated from each other.

As described above, as the hinge projection 366 is integrally formed with the link member 361 to be projected therefrom and hinged with the second link member 363, no separate hinge connection means such as stud member is required. Therefore, it is expected that the number of needed parts can be reduced, thereby reducing the manufacturing costs.

Meanwhile, although not shown in the drawings, it will be appreciated that the same effect can be obtained if the positions of the hinge projection and the hinge hole 363a are interchanged.

Figure 10:
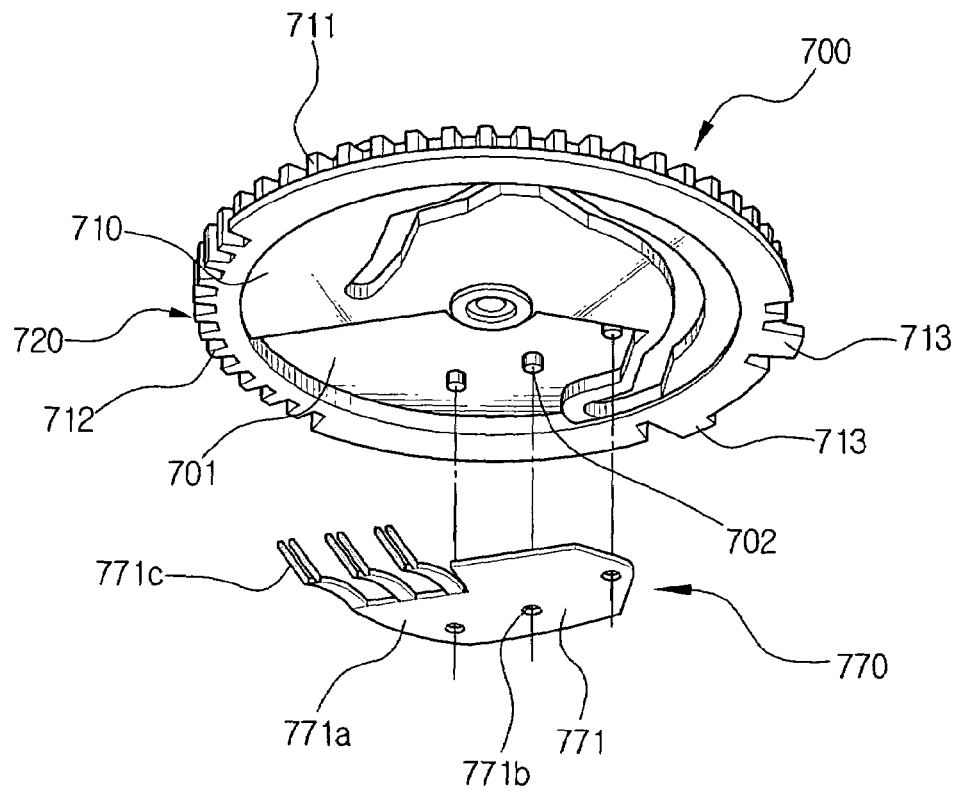
FIG. 10 is an exploded perspective view of the main cam gear extracted from FIG. 3.

Referring to FIGS. 3 and 10, the main cam gear 700 comprises a disc-shaped body 710; a gear section 720 formed on the circumference of the body; a main cam slot 730 formed on the bottom side of the body 710; a guide rail 740 formed on the top side of the body 710, and a projection pin 750 extended from the top surface of the body 710.

The gear section 720 comprises a main gear part 711 formed on the entire circumference of the body to receive power from the driving motor 101; a connection gear part 712 formed on a position lower than that of the main gear part 711; a pair of large gear teeth 713 provided on the leading and trailing ends of the connection gear part 712, respectively, and formed larger than other teeth of the connection gear part 712; and a sliding wing portion formed on the body 710 out of the connection gear part 712 and the large gear teeth 713.

The main gear part 711 is engaged with the connecting gear 103 to receive power. The connection gear part 712 is formed in a predetermined area in a position lower than the main gear part 711, preferably integrally with the main gear part 711. This connection gear part 712 is engaged with the second gear section 343 of the first loading gear 340. The large teeth 713 are spaced by a predetermined distance and formed to correspond to the gear valleys 343a, 343b. Of course, the large gear teeth 713 are not interfered with the connecting gear 103 because they are formed in a position lower than the main gear part 711, such as on the same position with that of the connection gear part 712. In addition, the large gear teeth 713 are sufficiently spaced so that they are not interfered with the first gear section 351 of the first loading gear 340 but selectively meshed with the second gear section 343. The sliding wing portion 714 is formed in a predetermined area of the circumference of the body 710 in a position lower than that of the main gear part 710, such as in the same position with that of the connection gear part 712 and the large gear teeth 713. The sliding wing portion 714 is projected in a circular arc shape so that it has a radius larger than that of the main gear part 711. The sliding wing portion 714 comes into sliding contact with a non-geared portion 343c of the second gear section 343. Therefore, the main gear part 711 maintains the sliding contact with the non-geared portion 343c in the state where the main gear part 711 is not engaged with the first loading gear 340.

Figure 13:
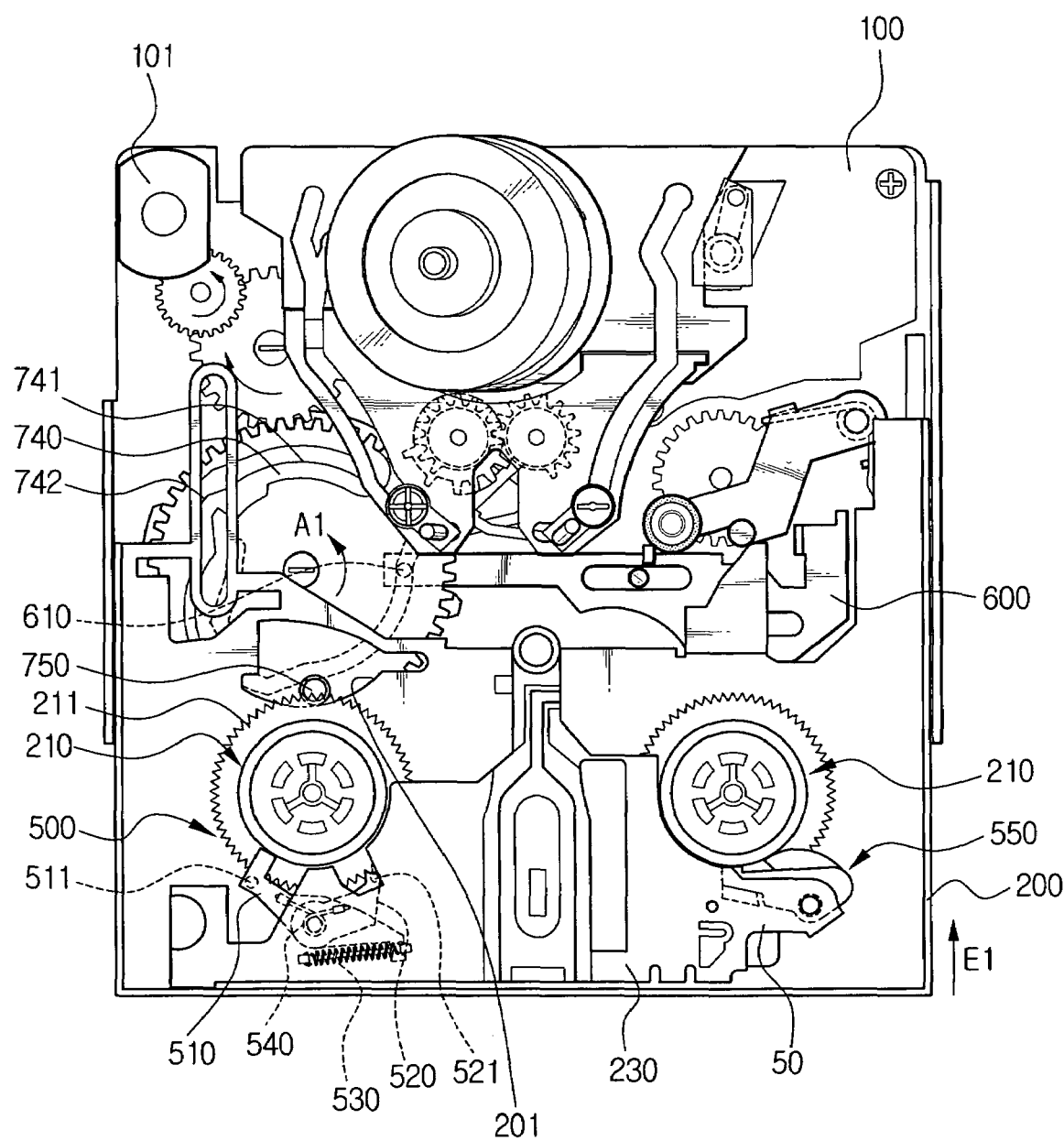
FIG. 13 is a schematic top plan view for illustrating the brake unit of the deck mechanism of the magnetic recording/reproducing apparatus according to an embodiment of the present invention.

The main cam slot 730 is formed in a predetermined length on the bottom side of the body 710 in the rotational direction. Referring to FIG. 13, the guide pin 610 of the main sliding member 600 is inserted into and guided in the main cam slot 730. Therefore, when the main cam gear 700 rotates, the guide pin 610 is guided along the main cam slot 730, whereby the main sliding member 600 is horizontally reciprocated. Here, the main cam slot 730 is formed in such a manner that it is variably spaced from the rotational center of the body 710 in the longitudinal direction thereof, so that the main sliding member 600 is guided to repeatedly perform at least one reciprocating movement every time the main cam gear 700 rotates in the direction B opposite to the loading direction A.

The guide rail 740 is formed on and projected from the top surface of the body 710 in a predetermined shape and length. The guide rail 740 is linked with the brake unit 500 to be mentioned below when the sub-deck 200 is loaded. The guide rail 740 is also formed in such a manner that is variably spaced from the rotational center of the body 710. The guide rail 740 has a first curved guide section 741, and a second guide section 742 formed to be laterally projected from the curved surface of the first guide section 741. The cooperating relation between these guide sections 741, 742 and the brake unit 500 will be described in further detail below.

Furthermore, the projection pin 750 extended from the body 710 is provided for the loading/unloading operation of the sub-deck.

A mode switch 770 is also provided on the bottom side of the main cam gear 700 (see FIG. 10). The mode switch 770 is adapted to sense various operating modes, such as the loading/unloading state of the sub-deck 200, the operation state of the pole base driving unit 300, and the driving states of the pinch roller unit 400, the brake unit 500, and so on, according to the rotation states of the main cam gear 700. The mode switch 770 comprises an elastic brush 771 to be mounted on the bottom side of the main cam gear 700, and an FPC 773 (shown in FIG. 11) mounted on the main deck 100 to be in contact with the elastic brush 771. An accommodation recess 701 is formed on the bottom side of the main cam gear 700 to accommodate the elastic brush 771. The accommodation recess 701 is provided with press-fit projections 702 for anchoring the elastic brush 771. Anchoring holes 771b formed in the elastic brush 771 are preferably interference-fitted onto the press-fit projections 702 to anchor the elastic brush 771.

The elastic brush 771 is manufactured from an electronically conductive material and comprises a plate-shaped body 771a provided with the anchoring holes 771b, and a plurality of contact pieces 771c extended from the body 771a. The contact pieces 771c are bent in a predetermined shape and elastically contacted with the FPC 773.

Figure 11:
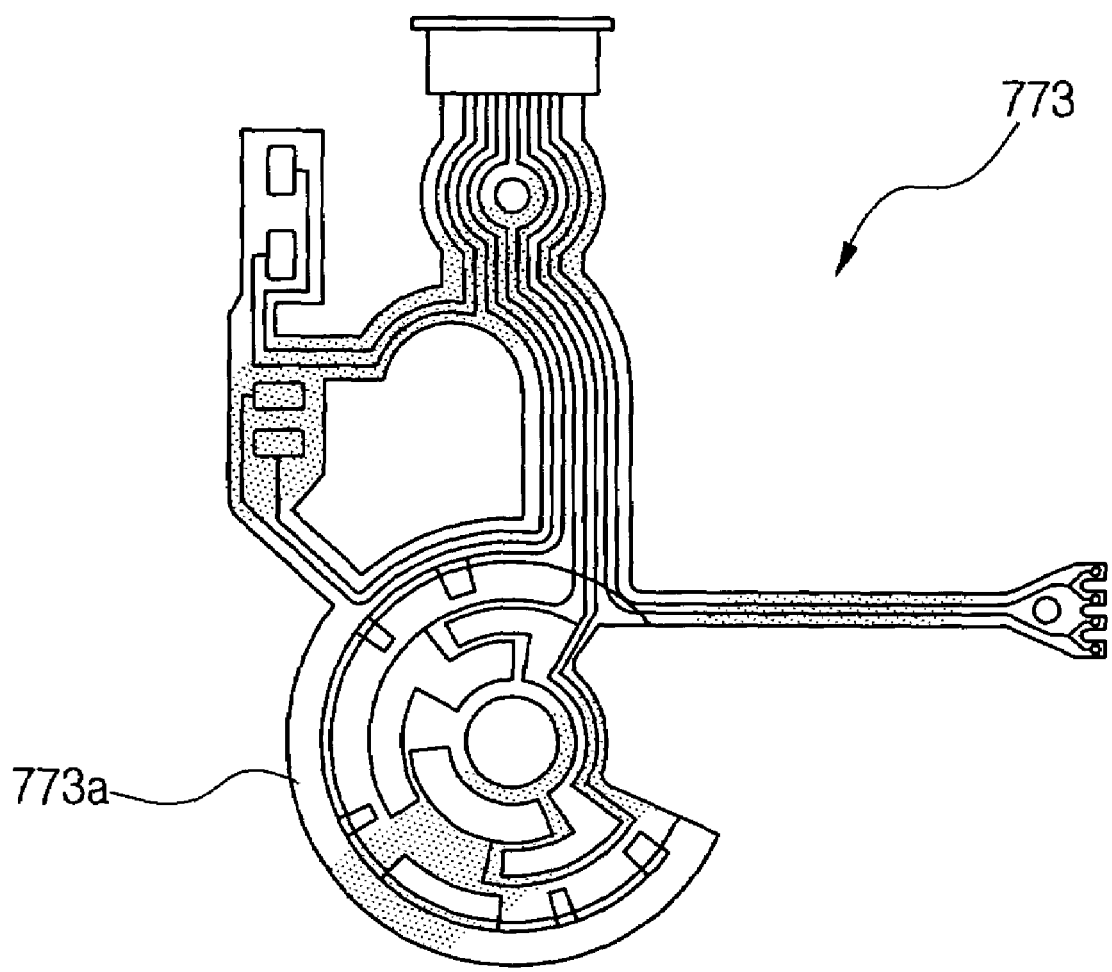
FIG. 11 is a top plan view of the FPC extracted from FIG. 10.

As shown in FIG. 11, the FPC 773 is attached and fixed on the top surface of the main deck 100. The FPC 773 has a mode-sensing pattern 773a of a predetermined shape to be selectively contacted with the contact pieces 771c of the elastic brush 771. The mode-sensing pattern 773a is formed in a circular arc shape and located around the rotational center of the main cam gear 700. Accordingly, the elastic brush 771 is selectively contacted with and then separated from the mode-sensing pattern 773a while being rotated along with the main cam gear 700, as a result of which the rotational state of the main cam gear 700 is sensed, from which various modes can be sensed.

Figure 12:
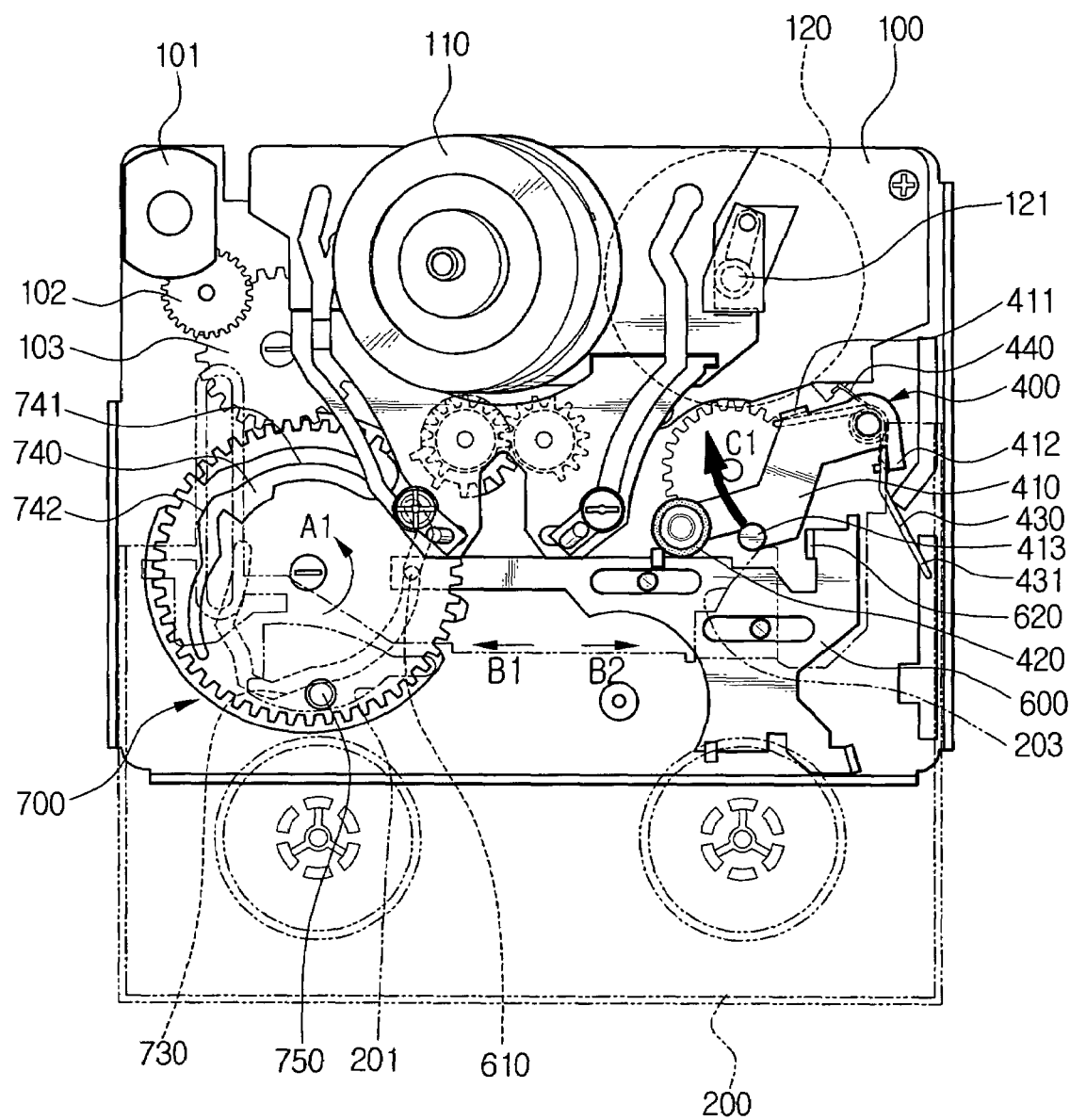
FIG. 12 is a schematic top plan view for illustrating the pinch roll unit of the deck mechanism of the magnetic recording/reproducing apparatus according to an embodiment of the present invention.

Referring to FIG. 12, the pinch roller unit 400 is provided to compressively urge the tape 10 against the spindle 121 of the capstan motor 120 when the sub-deck 200 is loaded. This pinch roller unit 400 comprises a pivot lever 410 pivotally mounted on the main deck 100, a pinch roller 420 rotatably mounted on the pivot lever 410, and a torsion spring 430 coaxially mounted on the pivot lever 410.

One end of the pivot lever 410 is rotatably mounted on the main deck 100. And, the other end of the pivot lever 410 is provided with the pinch roller 420. The pivot lever 410 is also provided with hook projections 411, 412 for supporting the opposite ends of the torsion spring 430. A pin 413 is projected from the lever 410, in which the pin 413 is contacted with and pushed by the sub-deck 200 as the sub-deck 200 is being loaded. The pinch roller 420 is closely contacted with the spindle 121 of the capstan motor 120 and guides the transfer of the tape when the sub-deck 200 is loaded.

The torsion spring 430 is installed in such a manner that it is wound coaxial to the rotational center of the pivot lever 410. The opposite ends of the torsion spring 430 are supported by the hook projections 411, 412, respectively, so that the spring is prevented from being unwound. When the sub-deck is loaded, the torsion spring 430 is firstly pushed and compressed toward the capstan motor 120 by the sub-deck 200, and then the torsion spring 430 is secondarily pushed and compressed by the sliding member 600, whereby the pinch roller 420 comes into close contact with the spindle 121 of the capstan motor 120. In this manner, one end of the torsion spring 430 is extended to a length sufficient to get out of the pivot lever 410 and then downwardly bent, so that it can be contacted with the sliding member 600. The bent part 431 of the torsion spring 430 formed in this manner is selectively contacted with and pushed by the main sliding member 600.

In addition, a return spring 440 is provided in order to return the pivot lever 410 from the loaded state to the unloaded state. The return spring 440 is mounted coaxial to the rotational center of the pivot lever 410. And, one end of the return spring 440 is anchored to the main deck 100 and the other end is anchored to the hook projection 412.

The main sliding member 600 is reciprocated in the directions B1 and B2 on the main deck 100. When the main cam gear 700 rotates, the movement of the main sliding member 600 in the directions B1 and B2 is controlled by the guide pin 610 being guided along the main cam slot 730 formed on the main cam gear 700. A compression projection 620 is formed, in which the compression projection 620 is upwardly bent to come into contact with and to compress the bent part 431 of the torsion spring 430, when the main sliding member 600 is moved in the direction B1.

Figure 14:
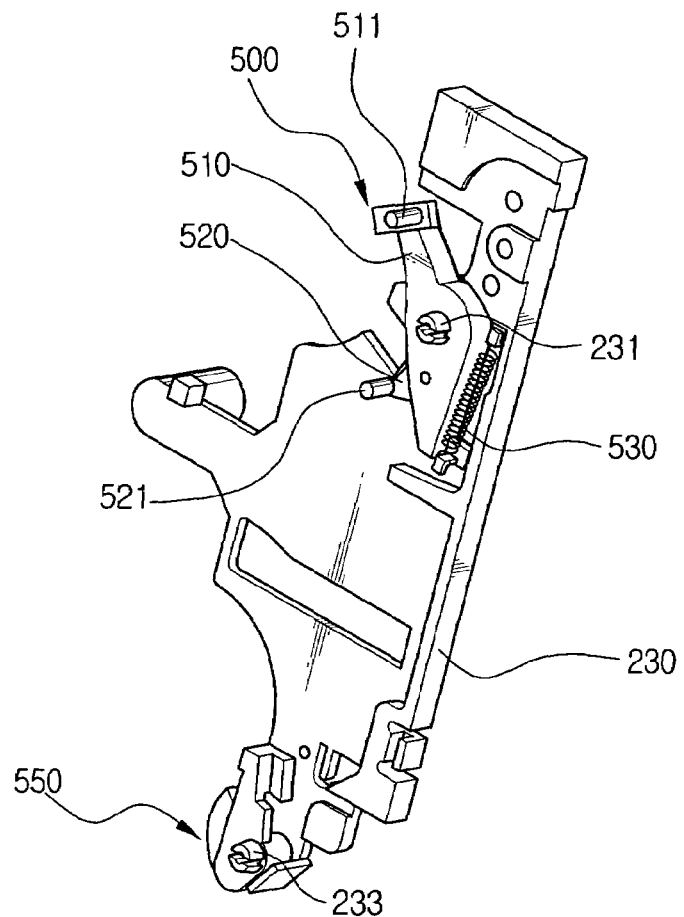
FIG. 14 is a perspective view showing the brake unit extracted from FIG. 13.

Referring to FIGS. 13 and 14, the brake unit 500 is rotatably installed on the sub-deck 200 to selectively brake the rotation of the reel disc 210. The brake unit 500 comprises a first brake 510, a second brake 520, a spring 530 and a torsion spring 540. In the embodiment of the present invention, the brake unit 500 is mounted on the reel cover 230. That is, the first brake 510 is pivotally mounted on the reel cover 230 and one end of the first brake 510 is contacted with or separated from the reel disc 210 depending on its rotation directions. The spring 530 is connected to the other end of the first brake 510 and the reel cover 230, and elastically urges the first brake 510 against the reel disc 210. The second brake 520 is pivotally installed coaxial to the first brake 510 and selectively contacted with or separated from the gear teeth 211 of the reel disc 210 while being pivoted. The torsion spring 540 is installed between the second brake 520 and the first brake 510. The torsion spring 540 elastically urges the second brake 520 against the gear teeth 211.

Figure 15:
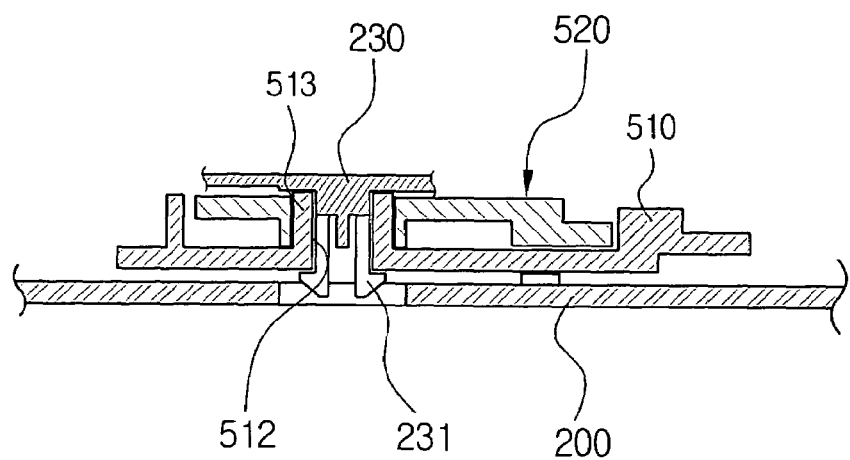
FIG. 15 is a partially cut-away cross-sectional view of the main part of FIG. 13.

Further, as shown in FIG. 15, a hook 231 is integrally formed on the bottom of the reel cover 230 to support the brakes 510, 520. The hook 231 is snapped into an axial bore 512 formed in the first brake 510 in a so-called one-touch manner. Then, the second brake 520 is rotatably fitted on the external periphery of the axial supporting part 513 of the first brake 510.

Here, the reel cover 230 is further provided with a brake unit 550 for braking the rotation of the remaining takeup reel disc 220. The brake unit 550 is operated in cooperation with the mains sliding member 600 and is well known in the art. Because the brake unit 550 is irrelevant to the gist of the present invention, a detailed description thereof will be omitted. However, the reel cover 230 is further integrally formed with a hook 233 for rotatably supporting the brake unit 550 in the take-up side. The hook 233 is pressure-fitted into the axial groove of the brake unit 550 in a so-called one-touch manner. As can be appreciated through the aforementioned construction, the brake units 510, 520, 550 are firstly assembled to the reel cover 230 and then the reel cover 230 is assembled on the top of the sub-deck 200. At this time, as the brakes 510, 520, 550 are assembled to the hooks 231, 233 formed integral to the reel cover 230, no separate assembling part will be needed. As a result, there is an advantage in that the number of assembled parts and assembly steps reduces, whereby costs can be saved.

Meanwhile, the brake unit 500 constructed as described above is operated in link with the main cam gear 700 when the sub-deck 200 is loaded/unloaded. Therefore, the first and second brakes 510 and 520 have first and second guide pins 511, 521, respectively, which are projected from them. Further, the sub-deck 200 is formed with guide holes (not shown), through which the first and second pins 511, 521 are capable of being moved. As the first and second guide pins 511, 512 are guided by the guide rail 740 formed in the main cam gear 700, the operations of the brakes 510, 520 are respectively controlled. In specific, the operations of the first and second guide pins 511, 521 are controlled in such a manner that the first guide pin 511 is guided by the first guide section 741 and the second guide pin 521 is guided by the second guide section 742. The detailed operations of the brakes 510, 520 by the guide pins 511, 521 will be described in further detail below.

Figure 16:
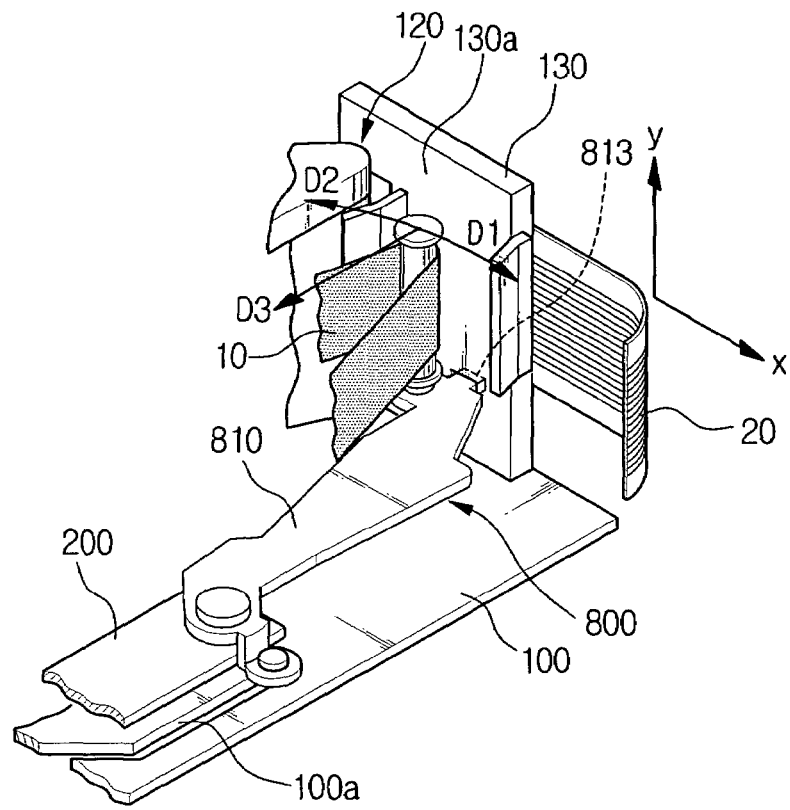
FIG. 16 is a schematic perspective view showing the review arm unit of the magnetic recording/reproducing apparatus according to an embodiment of the present invention.
Figure 17:
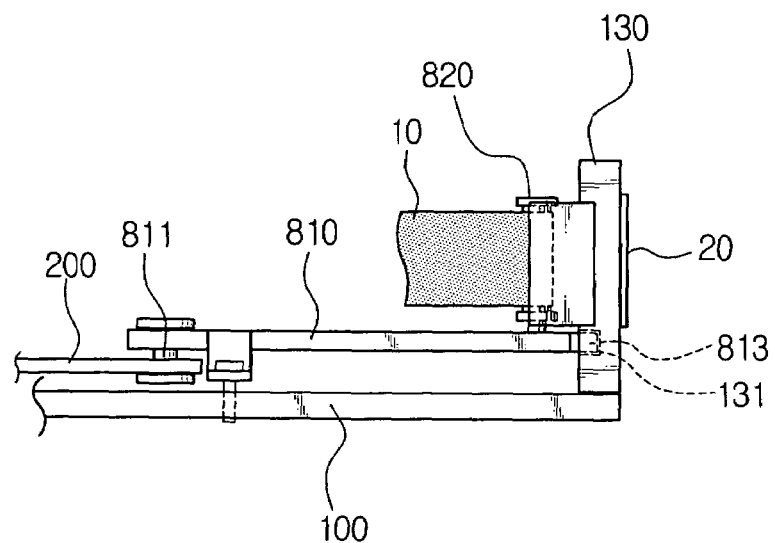
FIG. 17 is a side elevational view of the review arm unit shown in FIG. 16.

As shown in FIGS. 16 and 17, the review arm unit 800 guides the running of the magnetic tape 10 taken out from the take-up side reel disc 220 while being displaced by being linked with the sub-deck 200 at the time of loading/unloading of the sub-deck 200. Such a review arm unit 800 comprises a review arm 810 pivotally connected to the sub-deck 200 and a review pole 820 uprightly installed at the end of the review arm.

An axle 811 rotatably supports one end of the review arm 810 on the sub-deck 200. In addition, the review arm 810 has a guide pin 812, which is parallel to the axle 811 and moves along a guide slit 100a formed in the main deck 100. As the guide pin 812 is guided along the guide slit 100a at the time of loading/unloading of the sub-deck 200, the review arm 810 can be rotated about the axle 811.

The review pole 820 is positioned in the running path of the magnetic tape 10 taken out from the tape cassette, adjacent to the capstan 120, and guides the magnetic tape 10 while the magnetic tape 10 is running. The review pole 820 is movable in the directions D1 and D2 as the review arm 810 rotates. Such a review pole 820 is subjected to tension, which is generated in the magnetic tape 10, in the direction D3 while it is in contact with the magnetic tape 10. As a result, the review arm 810 is subjected rotational force in the direction D2 and thus may play. In addition, as the tension of the magnetic tape 10 is fluctuated, the review pole 820 can be temporarily moved in the directions D1 and D2. As such, the running of the magnetic tape 10 becomes unstable; therefore, reproduced pictures may tremble. Considering this point, means is provided for preventing the review arm 810 from playing in the state where the review arm 810 is loaded.

In particular, as means for preventing the play of the review arm 810, there are provided a projection 813 formed at the tip end of the review arm 810 to be projected and a block body 130 having a seating groove 131 corresponding to the projection 813. The block body 130 is provided on the top of the main deck 100. In this embodiment, it is preferable that the block body is an FPC holder for supporting an FPC 20, which enables conduction of electrical signals between the inner side and outer side of the deck. As the FPC 20 is supported on the FPC holder 130, the FPC 20 is prevented from being contacted with the review pole 820. The FPC holder 130 is formed with a seating groove 131, into which the projection 813 is inserted. The seating groove 131 is formed to have a width and a height corresponding to the width and height of the projection 813, respectively.

Therefore, at the time of loading the magnetic tape 10, the review arm 810 is pivoted while being moved with the sub-deck 200. In addition, the projection 813 of the review arm 810 is inserted into the seating groove 131. Then, the projection 813 of the review arm 810 cannot play in the directions of x and y-axes. Consequently, the review arm 810 is prevented from playing, and the review pole 820 is fixed in its posture despite of the tension applied thereto from the magnetic tape 10. Further, the review arm 810 is also prevented from playing in the direction of y-axis, whereby the review arm is capable of stably guiding the magnetic tape 10. Therefore, it is possible to obtain an effect for preventing picture inferiority such as tremble of picture at the time of reproducing mode.

Figure 18:
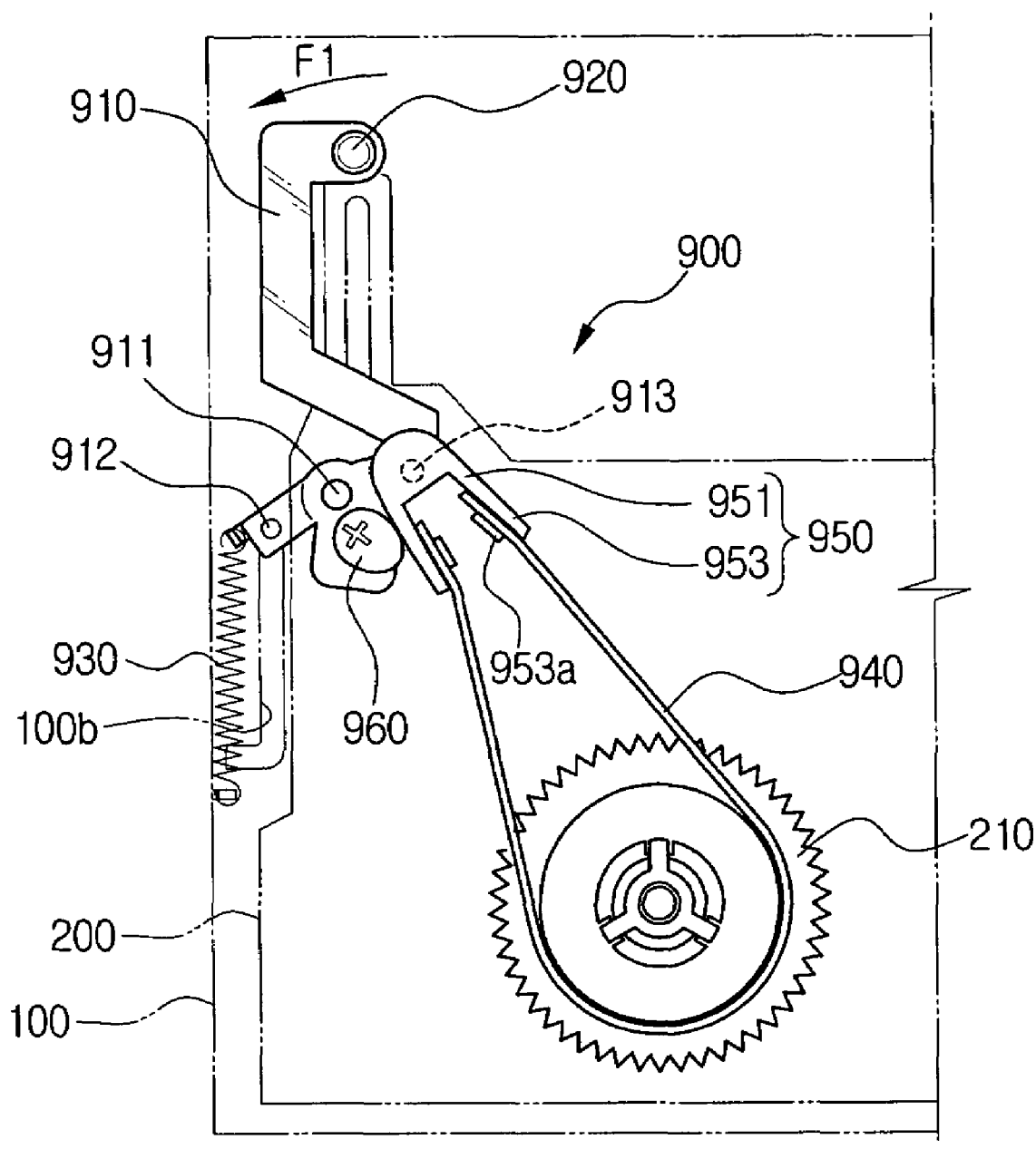
FIG. 18 is a schematic top plan view showing the tension pole assembly of the magnetic recording/reproducing apparatus according to an embodiment of the present invention.

The tension pole assembly 900 illustrated in FIG. 18 is provided to take out the magnetic tape 10 from the tape cassette at the time of loading the magnetic tape 10 and to draw the taken-out magnetic tape 10 to the outside of the main deck 10 so as to provide a predetermined tension for the magnetic tape 10. As shown in FIG. 18, such a tension pole assembly 900 comprises a tension arm 910, a tension pole uprightly installed on the tension arm 910, a spring 930, a brake band 940, a band holder 950 and an eccentric cam member 960.

The tension arm 910 is installed on the sub-deck 200 to be rotatable about a pivot pin 911. The tension pole 920 is installed on an end of the tension arm 910 to contact with, support and guide the magnetic tape 10. The tension arm 910 has a guide pin 912 formed to be projected downwardly parallel to the pivot pin 911. The guide pin 912 rotates the tension arm 910 while being guided along a guide slit 100b formed in the main deck 100 at the time of loading/unloading of the sub-deck 200. The spring 930 is connected to the tension arm 910 at one and to the main deck 100 at the other end, so that it elastically compresses the tension arm 910 in the direction F1.

The brake band 940 is installed to connect the supply side reel disc 210 and the tension arm 910, wherein the brake band 940 wraps a part of the outer circumference of the reel disc 210. Such a brake band 940 selectively provides a predetermined amount of braking force to the supply side reel disc 210 at the time of loading the magnetic tape 10, so that the tension of the magnetic tape 10 is adjusted at the time when the tape 10 is loaded or run. The brake band 940 is formed from a fiber material or a film shaped metallic material.

Meanwhile, the tension arm 910 side of the brake band 940 is supported by band supporting means provided on the tension arm 910 to be spaced from the hinge axis 911, which is the pivot center of the tension arm 910. If the brake band 940 is formed in a closed curve shape, it is possible to separately use a shaft member (not shown) capable of supporting the tension arm 910 side of the brake band 940 suspended thereon. If the brake band 940 has opposite ends cut as in the present embodiment, it is possible to constitute various types of band supporting means, including using a separate member such as the band holder 950 shown in FIGS. 19 and 20.

The band holder 950 in this embodiment comprises: a pivot body 951 mounted on the tension arm 910 in such a way that the pivot body 951 is pivoted on a first axis 913 spaced from the hinge axis 911 which is the pivot center of the tension arm 910; and a pair of supporting pieces 953 formed on the pivot body 951 to be projected from the circumferential surface of the pivot body 951, so that the supporting pieces 953 support the opposite ends of the brake band 940. Hooks 953a are respectively formed inside of the ends of the supporting pieces 953 each to be hooked the opposite ends of the brake band 940. A single supporting piece may be formed if both of the opposite ends of the brake band 940 can be supported even if a pair of the supporting pieces are not provided as in this embodiment. In this case, the band holder 950 is formed in a mold product so that the pivot body 951 and the supporting pieces 953 can be easily formed in a single body, in which it is preferable to form the pivot body 951 and the supporting pieces 953 with a synthetic resin having a predetermined magnitude of restoring force so that the supporting pieces 953 are elastically deformable.

Figure 19:
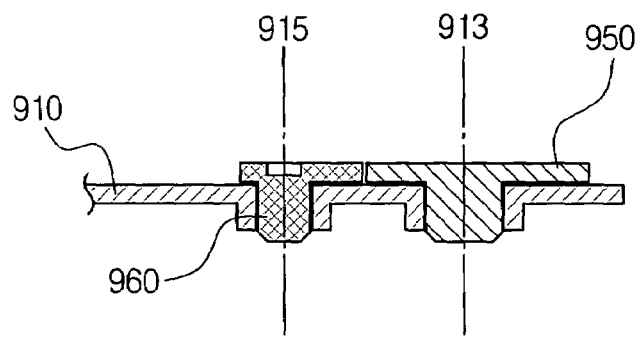
FIG. 19 is a cross-sectional view showing the main part of FIG. 18.

Referring to FIG. 19, the eccentric cam member 960 is installed on the tension arm 910 so that it is eccentrically rotated on a second axis 915 spaced from both of the hinge axis 911 and the first axis 913. The eccentric cam member 960 is installed in such a way that its profile is directly contacted with the band holder 950 or the brake band 940. According to this, the profile of the eccentric cam member 960, in which the distance between the profile and the second axis 915 is linearly variable at the time of eccentric rotation of the eccentric cam member 960, compresses the band holder 950 or the brake band 940, whereby it is possible to render the tension of the brake band 940 variable. The eccentric cam member 960 in this embodiment is installed on the tension arm 910 so that its circumference surface is contacted with the supporting pieces 953 of the band holder 950. With this construction, it is possible to arrange the eccentric cam member 960 and the band holder 950 in a same plane on the tension arm 910. Therefore, it is possible to reduce total thickness of the tension pole assembly 900, whereby enabling the sliming of the entire deck.

The operation of the tension pole assembly 900 having the above construction is briefly described. At the time of loading the sub-deck 200, the tension pole assembly 900 is rotated to the direction for taking out the magnetic tape 10 on the sub-deck 200.

Figure 20:
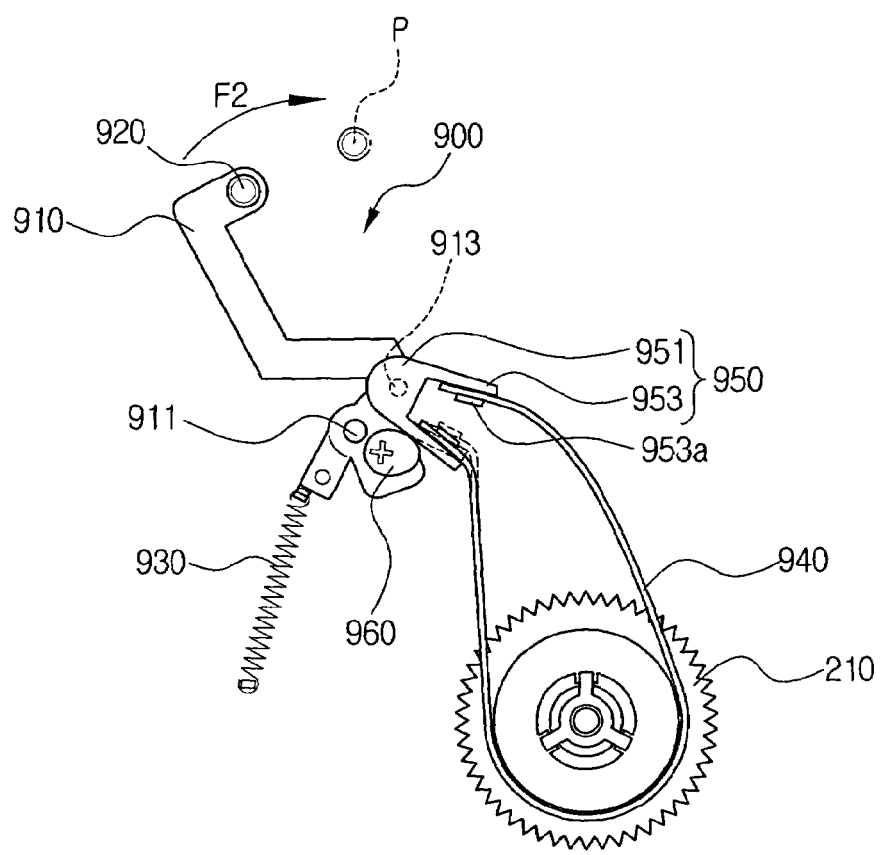
FIGS. 20 and 21 are schematic top plan views for illustrating the operation of the tension pole assembly shown in FIG. 18, respectively.

In the meantime, in the state where the tension arm 910 is completely pivoted as shown in FIG. 20, a situation may be caused in which the position of the tension pole 920 slants toward the outside of the main deck 100 beyond the reference position P. In this case, the eccentric cam member 960 is rotated counterclockwise. As described above, if the eccentric cam member 960 is rotated counterclockwise, the supporting piece 953 contacted with the profile of the eccentric cam member 960 is compressed. If the supporting piece 953 is compressed in this manner, the shape of the band holder 950 having a predetermined restoration force is elastically deformed as indicated by hidden lines in FIG. 20. Due to the deformation of shape of the band holder 950, the space between the end of the supporting end 953 and the supply side reel disc 210 is widened. Then, the tension arm 910 is rotated in the direction F2 of FIG. 20 by the variable tension of the brake band 940 and the tension pole 920 is positioned on the preset reference position P of the tension pole 920.

Figure 21:
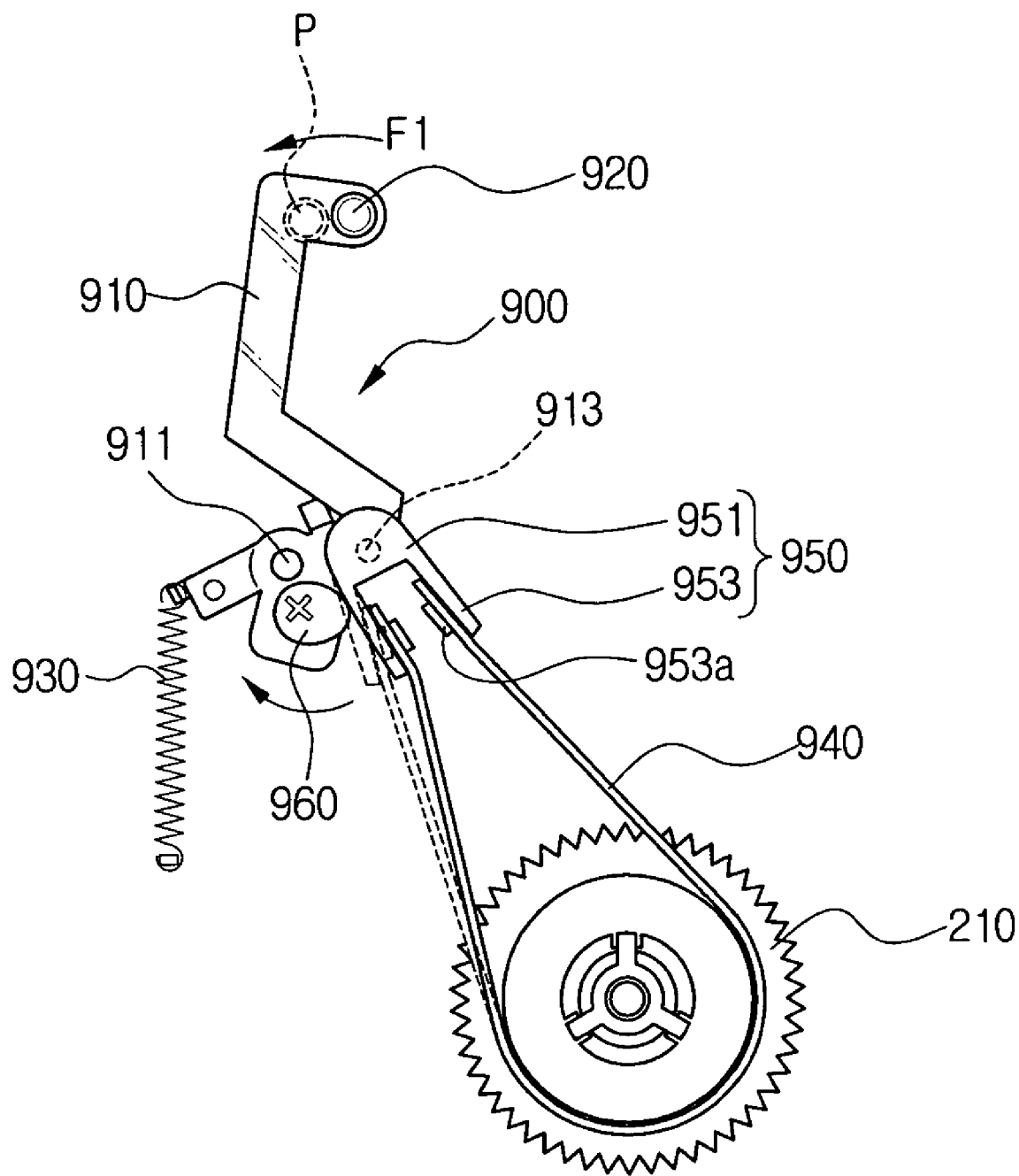

In the meantime, in the case where the position of the tension pole 920 does not arrive at the reference position P as shown in FIG. 21, the eccentric cam member 960 is rotated clockwise. Then, the magnitude of the compressive force applied to the supporting piece 953 of the band holder 950 due to the contact with the eccentric cam member 960 decreases. By this, the shape of the band holder 950 restores to its origin, and concurrently with this the tension arm 910 is rotated by the elastic restoring force of the spring 930 in the direction of F1 in FIG. 21 until a predetermined contact force is generated between the supporting force 953 and the eccentric cam member 960. Thereby, the tension pole 920 is capable of being positioned on the reference position P.

Figure 22:
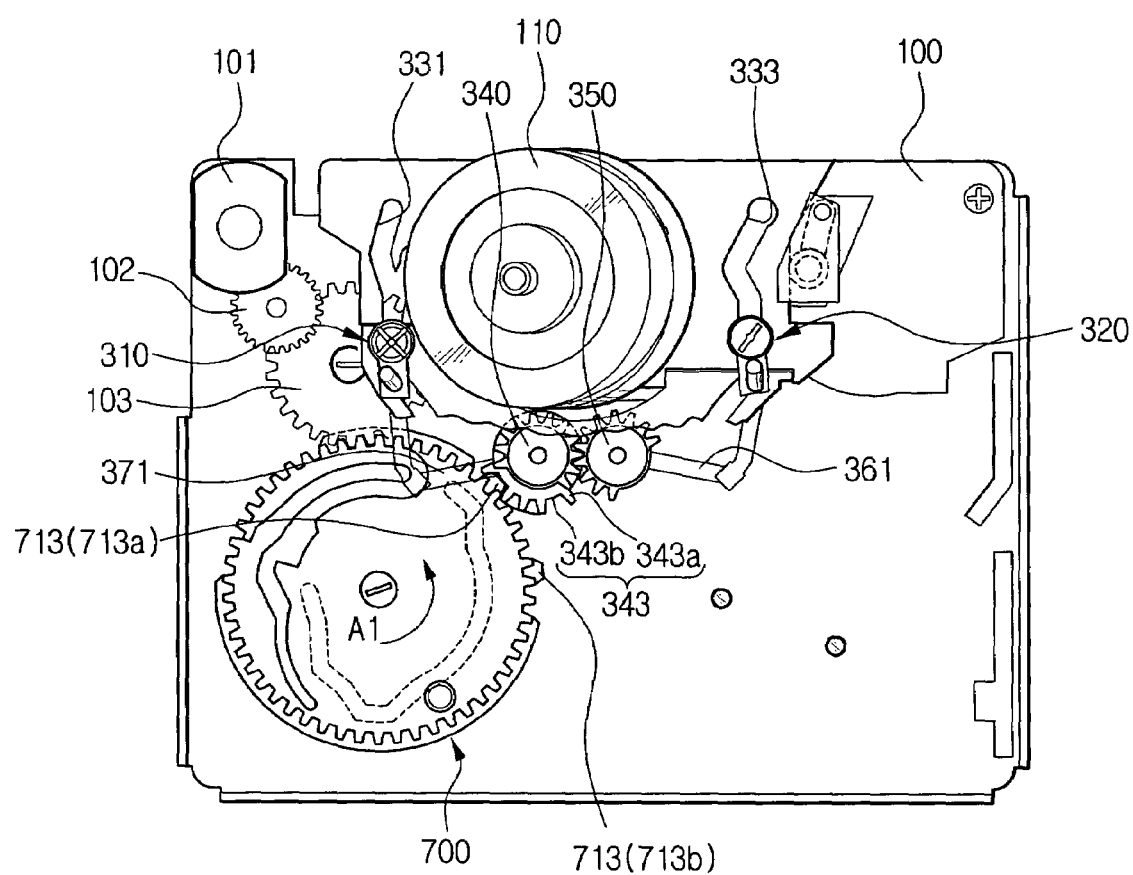
FIGS. 22 to 24 are top plan views for illustrating the loading states of the pole base loading unit of the deck mechanism of the magnetic recording/reproducing apparatus according to an embodiment of the present invention, respectively.

The operation of the deck mechanism for a magnetic recording/reproducing apparatus according to the previously described embodiment of the present invention will now be described in more detail with reference to the rotational driving of the main cam gear 700 with reference to FIG. 22.

Here, when the main cam gear 700 rotates, the loading operation of the sub-deck 200, the loading operation of the pole base unit 300, the loading operation of the pinch roller unit 400, and the operation of the brake unit 500 are performed concurrently or continuously in a timely linked manner. However, for the purpose of convenience of description, the operations will be classified by the units and described. However, because the operations of the review arm unit 800 and the tension pole assembly 900 were described above in detail, the description will be omitted hereinbelow.

Figure 23:
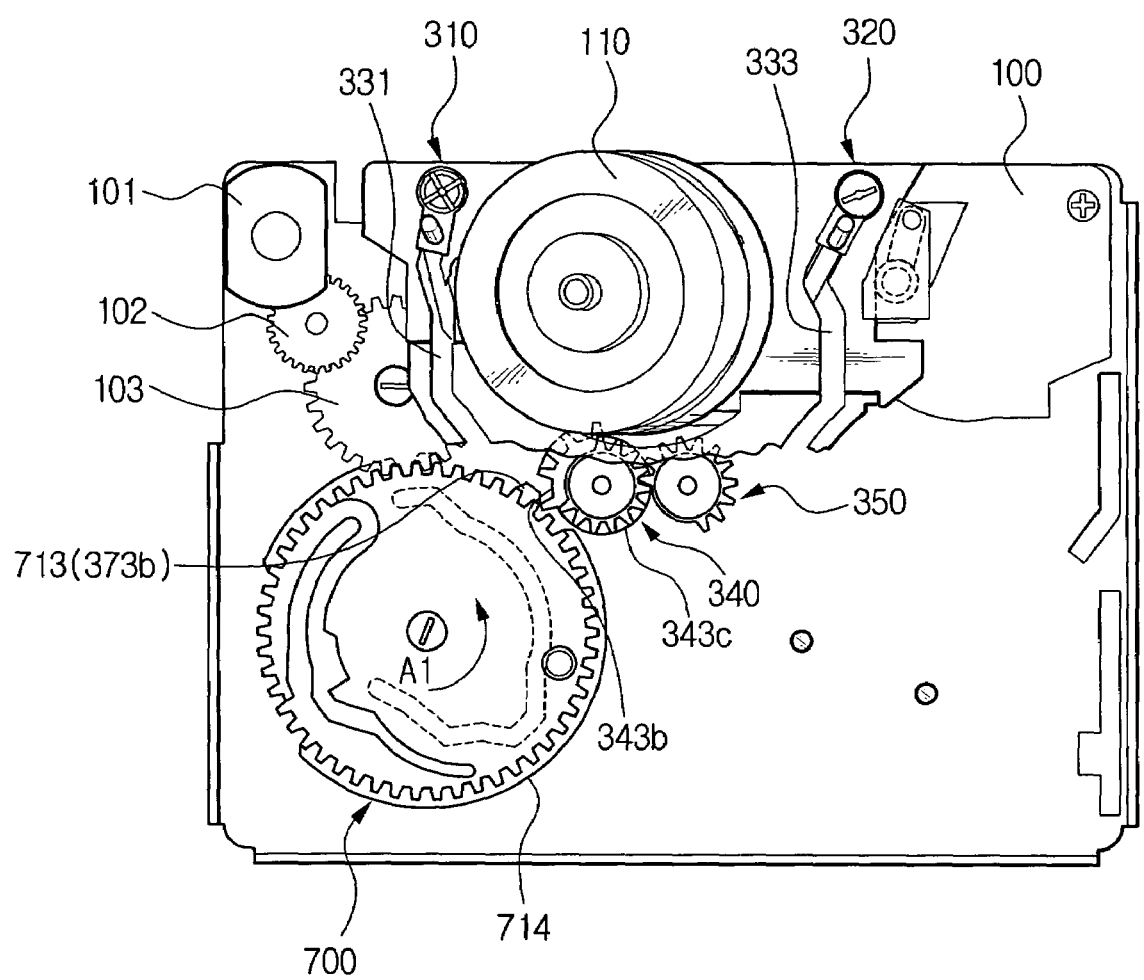
Figure 24:
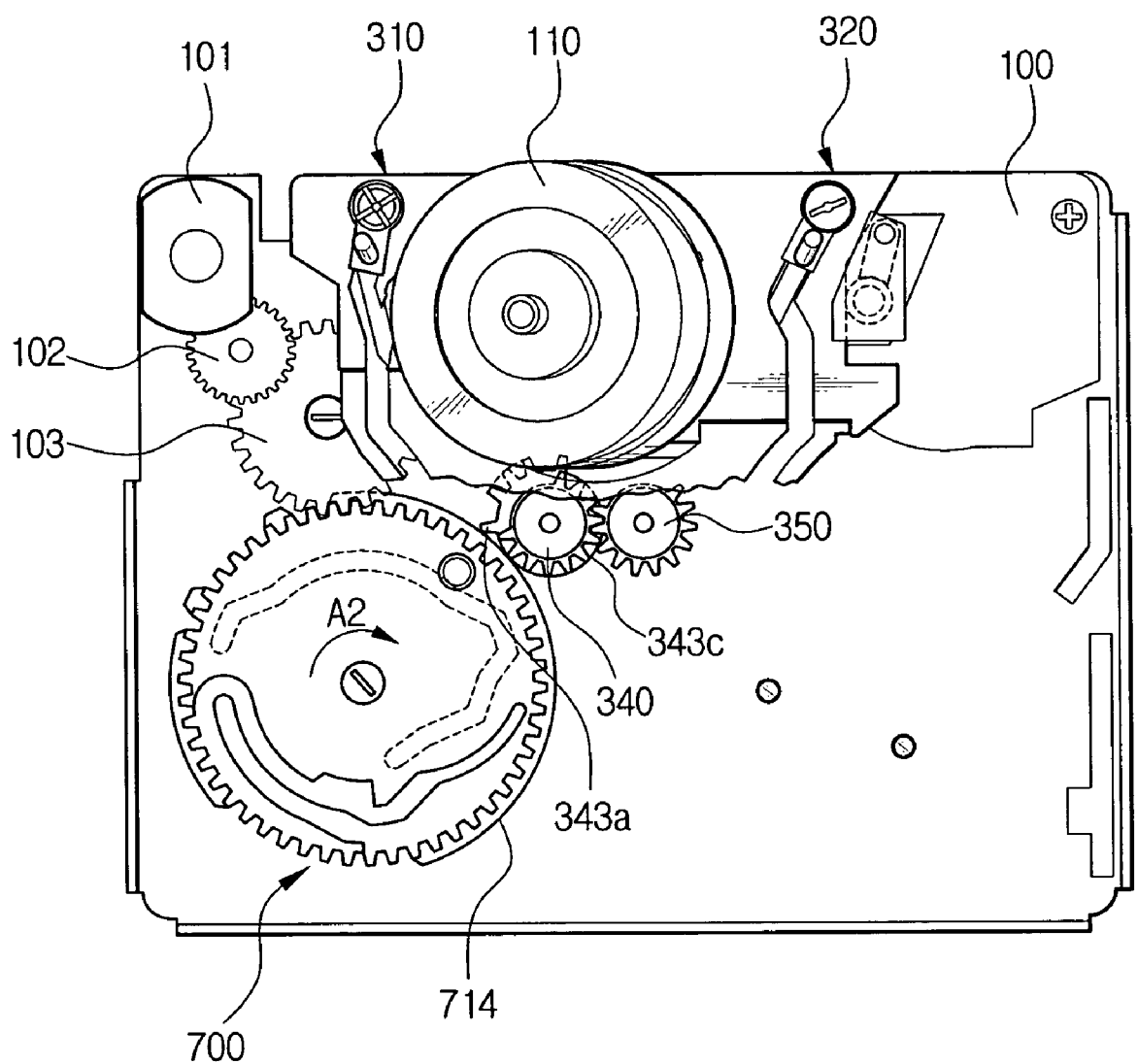

FIG. 23 illustrates the unloaded state of the pole base assemblies 310, 320. In this state, a tape cassette is installed into the sub-deck 200 not shown in this drawing. Then, the main cam gear 700 starts to rotate in the direction A1 as the driving motor 101 is driven. The front large gear tooth 713a of the main cam gear 700 is meshed with the gear valley 343b of the first loading gear 340. Then, as shown in FIG. 22, the second gear section 343 is engaged and linked with the connection gear part 712 of the main cam gear 700 from this point. Therefore, the first loading gear 340 is rotated and the second loading gear 350 is also cooperatively rotated therewith. Then, the link members 361, 371 integrally connected to the loading gears 340, 350, respectively, are extended while being concurrently rotated, and the pole base assemblies 310, 320 are moved along the guide rails 331, 333. Thereafter, if the rear large gear tooth 713b gets out of the other gear valley 343c of the first loading gear 340, the engagement between the main cam gear 700 and the first loading gear 340 is released, as shown in FIG. 23. Therefore, the first loading gear 340 is not rotated any further, and only the main cam gear 700 rotates by a predetermined angle. In this time, the pole base assemblies 310, 320 are completely in close contact with the terminal ends of the assembled guide rails 331, 333, respectively. And, as shown in FIG. 24, the sliding wing portion 714 is maintained in contact with both of the non-gear part 343c and the second gear section 343a of the first loading gear 340. Therefore, the second gear section 343a is caught on the sliding wing portion 714, and thus the second gear section 343a is prevented from being rotated in the opposite direction, i.e. in the direction where the pole base assemblies 310, 320 are unloaded. And, even if the main cam gear 700 is additionally rotated in the direction A, the additional rotation is allowed because the wing portion 714 is slid in the state contacted with the non-gear part 343c.

Meanwhile, if the main cam gear 700 is rotated in the direction A2 from the state shown in FIG. 24 in a same manner as the pole base unit 300 is loaded by the rotation of the main cam gear 700 as described above, it is possible to allow the main cam gear 700 to engage with and rotate the first loading gear 340 only in a predetermined area in the reverse order as compared that loading. Therefore, it is possible to perform the loading/unloading driving of the pole base loading unit 300 with a simple construction.

Next, the loading operation of the pinch roller unit 400 will be described along with the reciprocating movement of the main sliding member 600 and the loading operation of the sub-deck 200.

FIG. 12 illustrates the state in which the main cam gear 700 rotates by a predetermined angle in the direction A1 and the sub-deck 200 is loaded to the extent of a predetermined distance. That is, when the main cam gear 700 rotates, the sub-deck 200 is loaded while the cam slot 210 formed in the sub-deck is being guided by the projection pin 750. While the sub-deck 200 is being loaded, the compression part 203 of its leading end pushes the pin 413 of the pivot lever 410 to rotate the pivot lever 410 in the direction C1. Simultaneously with this, the main sliding member 600 is guided by the cam slot 730 formed in the main cam gear 700 and moves by a predetermined distance in the direction B2.

Figure 25:
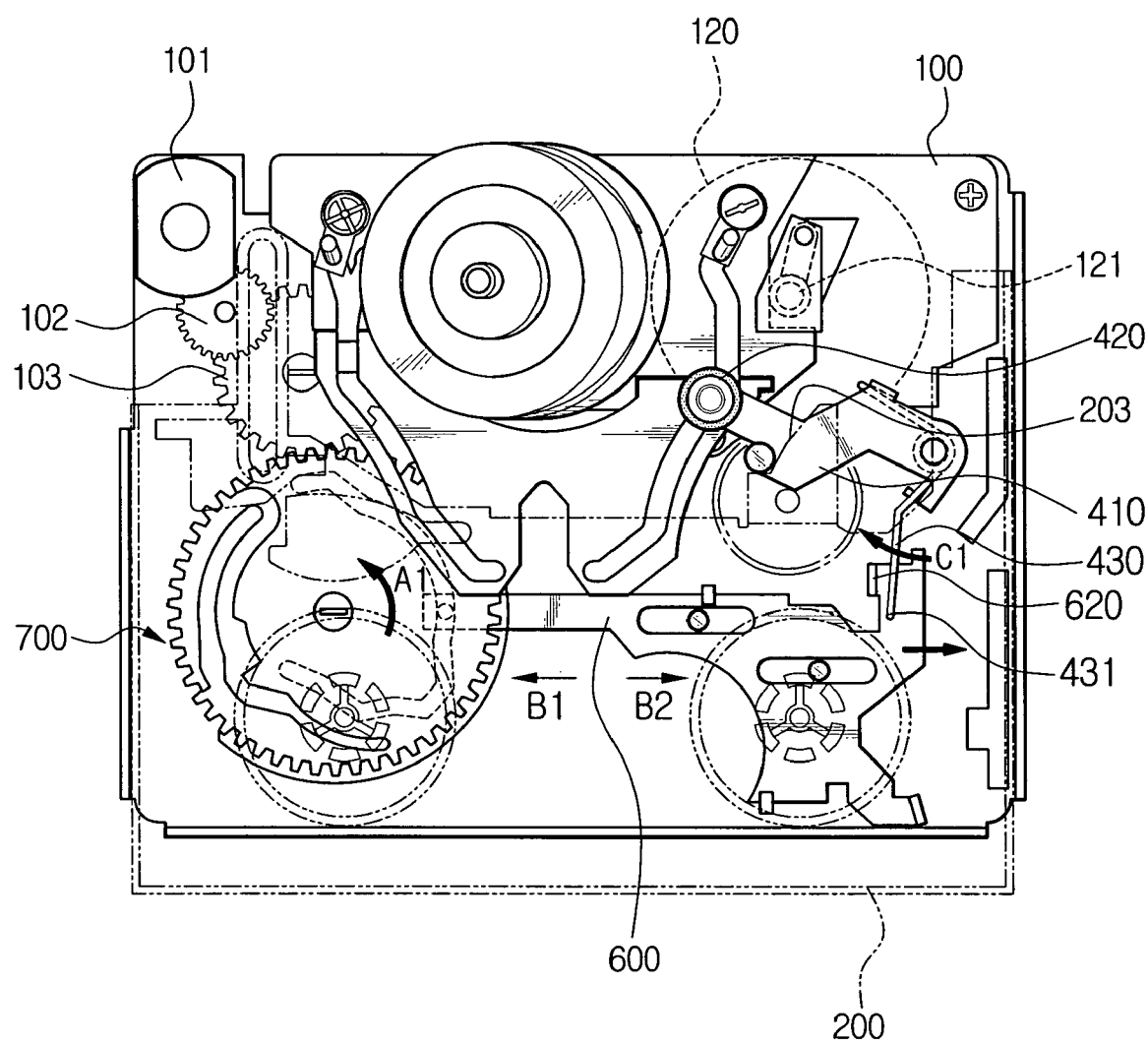
FIGS. 25 to 28 are top plan views for illustrating the loading operation of the pinch roller unit of the deck mechanism of the magnetic recording/reproducing apparatus according to an embodiment of the present invention, respectively.
Figure 26:
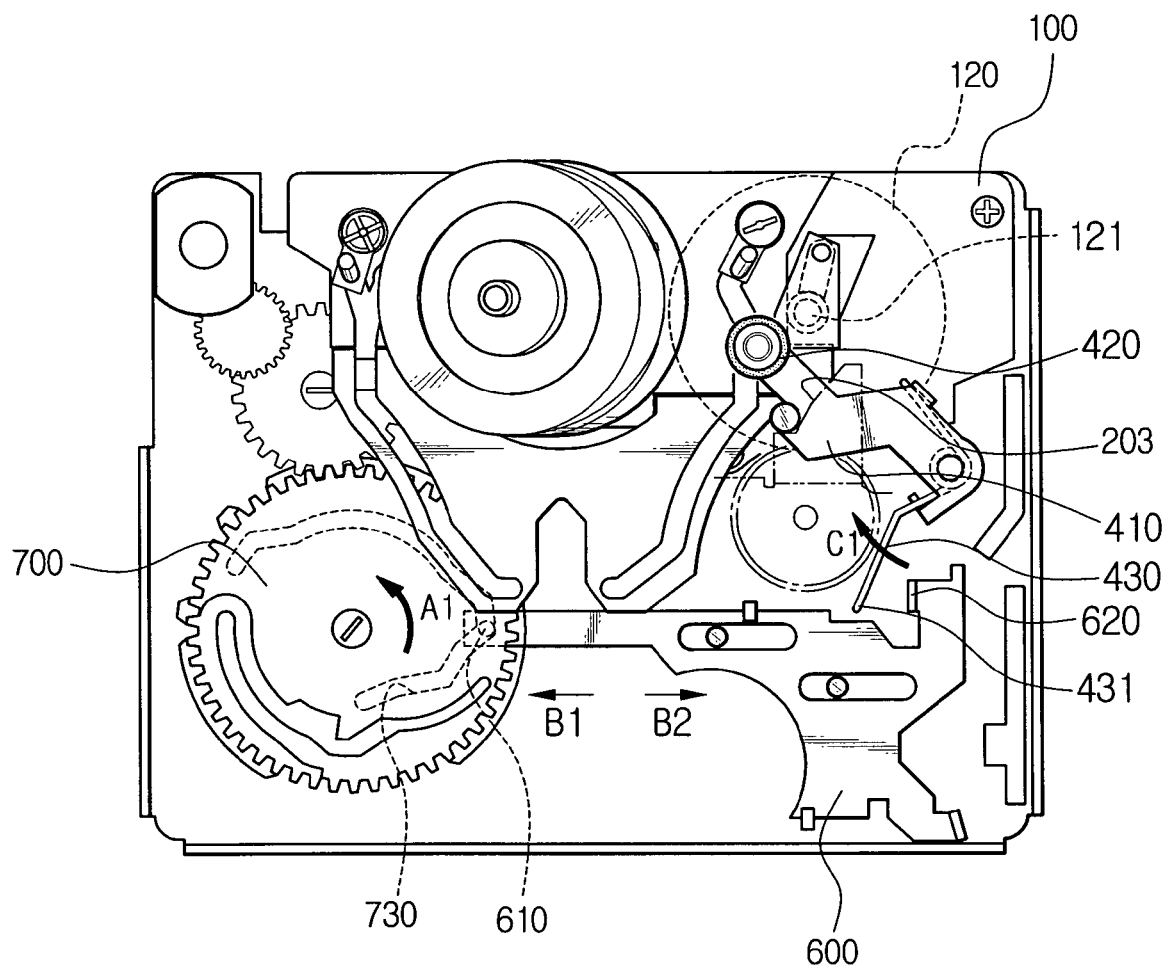

As shown in FIG. 25, in the state where the main sliding member 600 moves by a predetermined distance in the direction B2, the compression projection 620 of the main sliding member 600 is positioned within the rotation radius of the torsion spring 430. Therefore, the torsion spring 430 is additionally rotated in the direction C1 along with the pivot lever 410, as shown in FIG. 26. Then, the bent part 431 of the torsion spring 430 passes by the compression projection 620 without any interference and is positioned in the left side of the compression projection 620. More particularly, the bent part 431 is positioned within the moving section of the compression projection 620 to the direction B1. And, the bent part 431 of the torsion spring 430 is positioned as described above, the loading of the sub-deck 200 is completed and the pinch roller 420 is contacted with the spindle 121 of the capstan motor 120 with the tape being interposed between the pinch roller 420 and the spindle 121.

Figure 27:
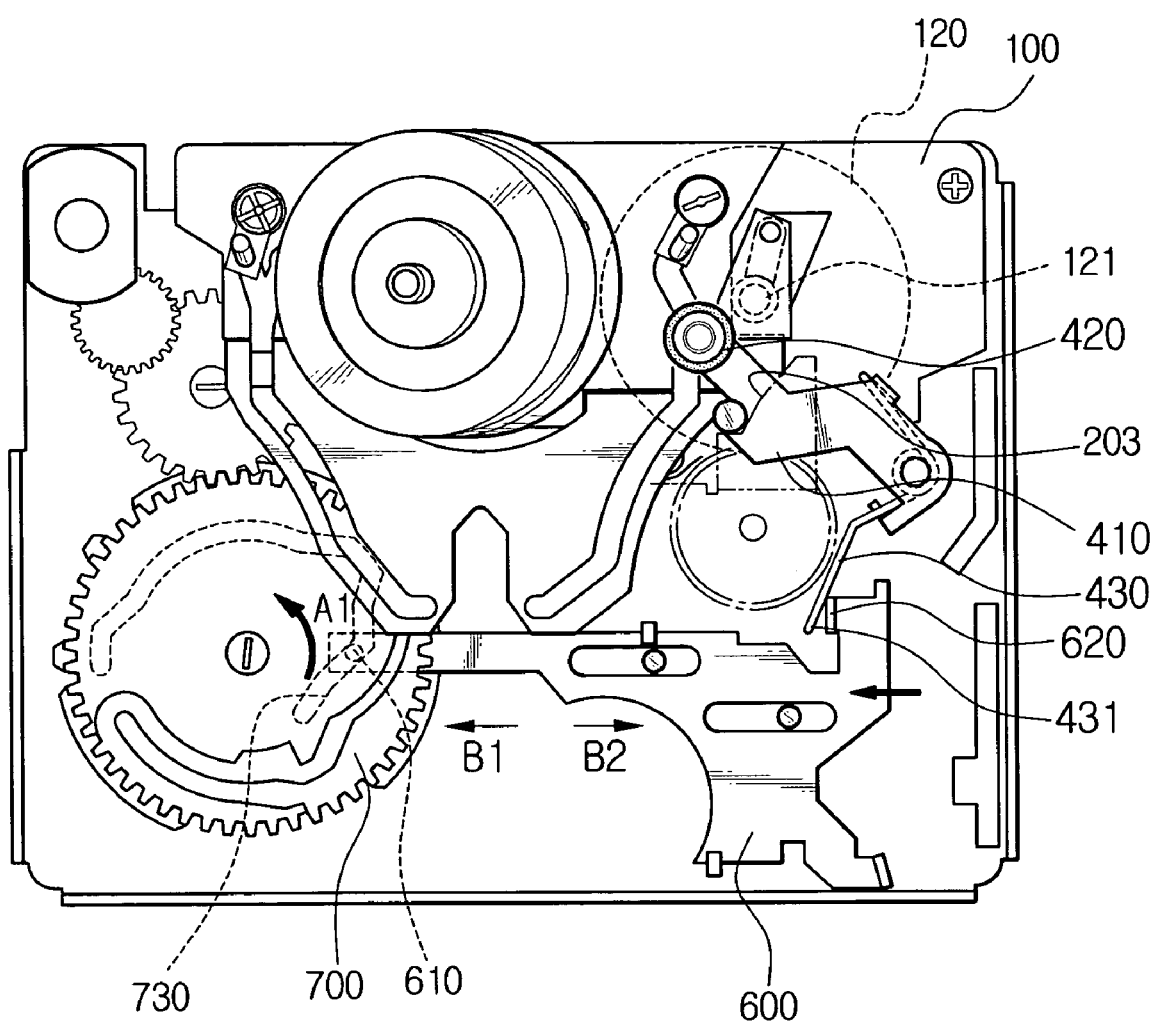
Figure 28:
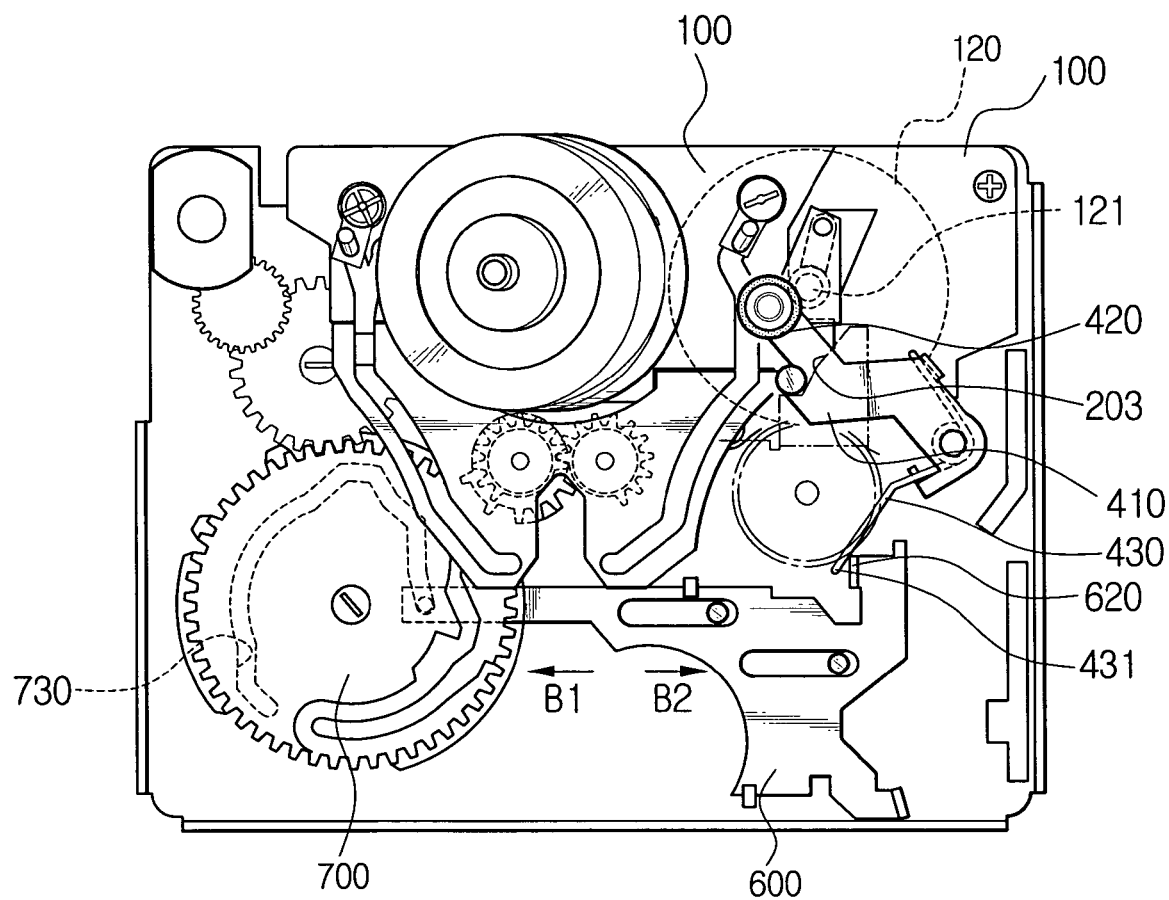

As described above, the main cam gear 700 is additionally rotated in the direction A1 even in the state where the loading of the sub-deck 200 is completed. Then, the guide pin 610 of the main sliding member 600 is guided along the cam slot 730, whereby the main sliding member 600 is moved in the direction B1. Then, as shown in FIG. 27, the compression projection 620 comes into contact with the bent part 431 of the torsion spring 430. If the standby state is provided in this manner and then turned into the play state, the main cam gear 700 is additionally rotated in the direction A1. Then, the main sliding member 600 is guided by the cam slot 730 and completely moved in the direction B1, as shown in FIG. 28. In this time, the compression projection 620 compressively moves the bent part 431 of the torsion spring 430 in the direction B1. Therefore, the torsion spring 430 is compressed to the extent it is pushed and the pinch roller 610 comes into close contact with the spindle of the capstan motor by the compressive force. Like this, if the operation of the pinch roller unit 400 is controlled with the rotational force and operation of the main cam gear 700, there is an advantage in that the construction is simplified and the operation becomes neat. Here, the unloading or return operation of the pinch roller 410 is in the order reverse to that in the loading of the sub-deck 200. The return force of the pivot lever 420 is provided by the elastic restoring force of the return spring 440.

Next, the operation of the brake unit 500 will be described along with the operations of the main cam gear 700 and the sub-deck 200.

Figure 29:
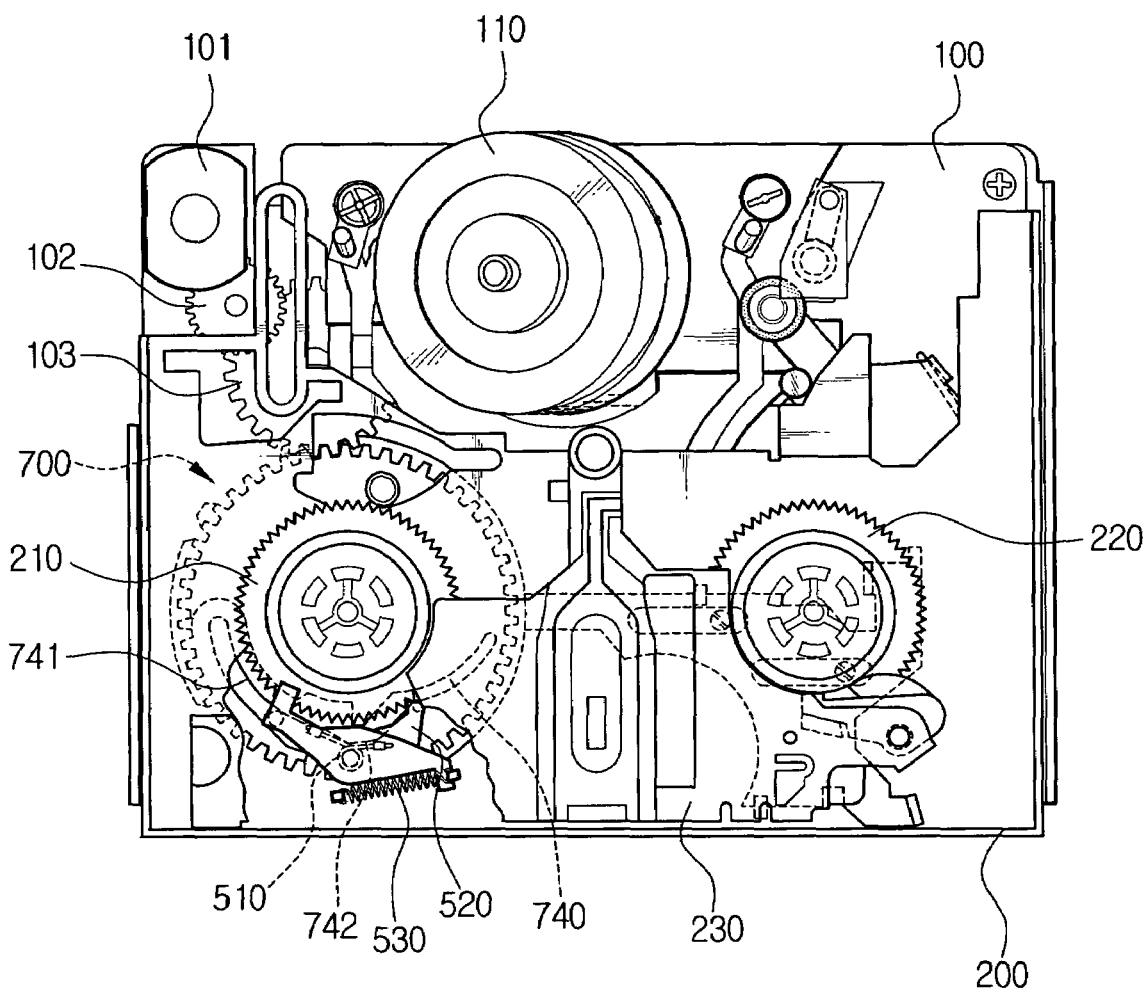
FIGS. 29 and 30 are top plan views for illustrating the loading operation of the brake unit of the deck mechanism of the magnetic recording/reproducing apparatus according to an embodiment of the present invention, respectively.
Figure 30:
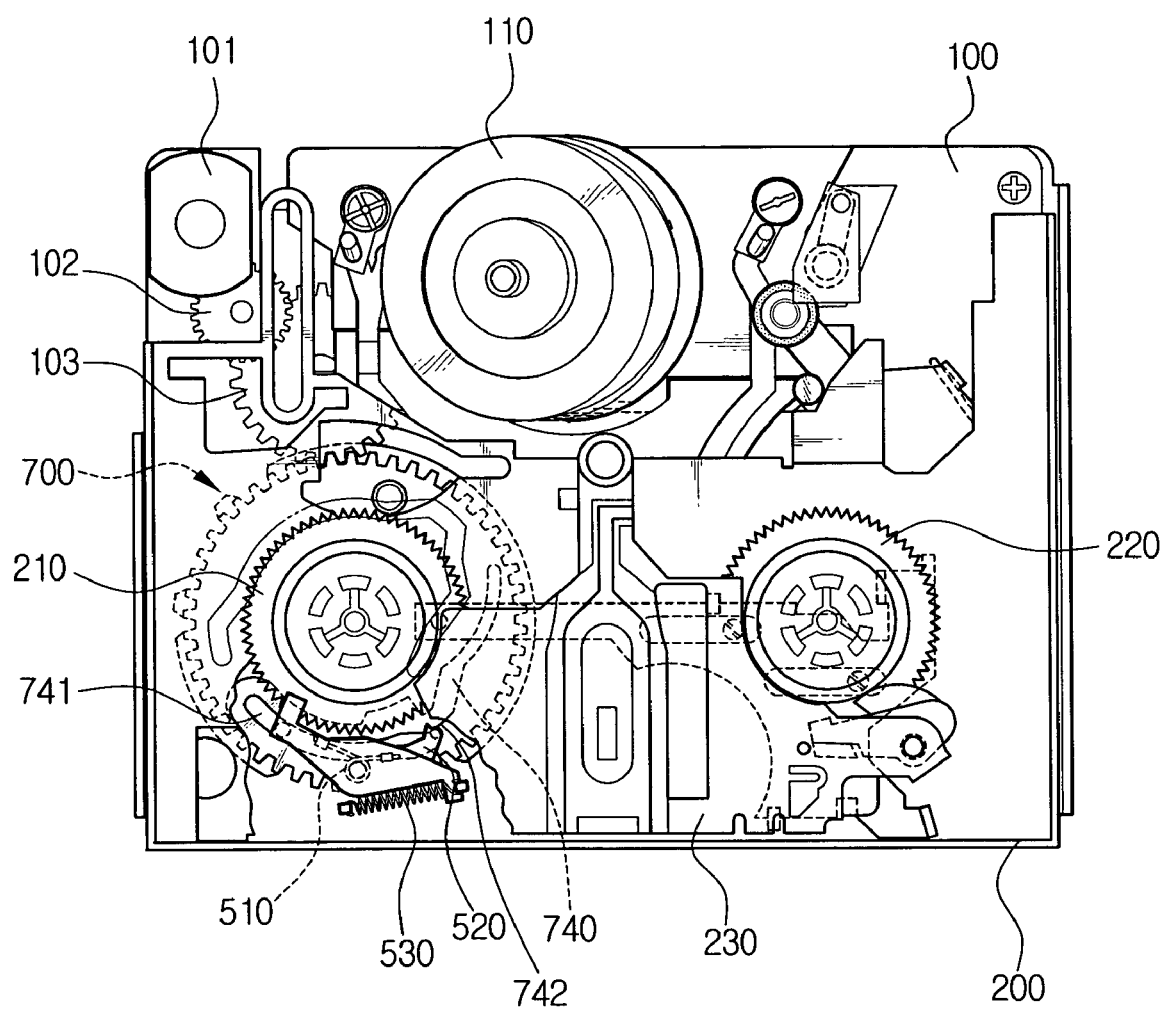

In the state shown in FIG. 13, no tape cassette is installed and the sub-deck 200 is unloaded. In this unloaded state, the first and second brakes 510, 520 are in contact with the reel disc 210. From this state, if the main cam gear 700 is rotated in the direction A1 as the driving motor 111 is being driven, the sub-deck 200 is drawn by the projection pin 750, so that the sub-deck 200 starts to be loaded. And, if the sub-deck 200 is somewhat loaded, the guide pins 511, 521 of the brakes 510, 520 sequentially come into contact with the guide rail 740 to be guided by the guide rail 740. That is, as shown in FIG. 29, as the guide pin 511 of the second brake 510 is firstly introduced into the first guide section 741 and guided, the first brake 510 is pivoted and separated from the reel disc 210. And, if only the main cam gear 700 is additionally rotated in the direction A after the sub-deck 200 is completely loaded, the guide pin 511 is guided by the first guide section 741 and the second guide pin 521 is guided by the second guide section 742, thereby rotating the second brake 520, as shown in FIG. 30. As such, the first and second brakes 510, 520 are separated from the reel disc 210. Therefore, the reel disc is laid in the freely rotatable state.

Of course, at the time of unloading, the main cam gear 700 is rotated in the direction opposite to the rotating direction at the time of loading. Therefore, the first and second guide pins 511, 521 are separated from the guide rail 740 and the first and second brakes 510, 520 come into contact with the reel disc 210 again.

As described above, in the deck mechanism for a magnetic recording/reproducing apparatus according to the embodiment of the present invention, the pole base loading unit 300, the pinch roller 400, the brake unit 500 and the sub-deck are concurrently driven as the main cam gear is rotationally driven. Therefore, any separate means for driving the individual units is not required, the number of components is minimized, and entire construction is simplified. The deck mechanism according to the present invention will largely contribute to reduce the size and weight of a final product.

As described above, according to the deck mechanism for a magnetic recording/reproducing apparatus of the present invention, it is possible to concurrently drive a plurality of units, such as the sub-deck, the pole base unit, the pinch roller unit and the brake unit with the rotational driving force of the one main cam gear. Therefore, the construction is simplified and the number of components is reduced, whereby it is easy to reduce the size and weight of a final product. In addition, it is possible to reduce the costs and manufacturing processes, whereby the productivity can be enhanced.

Figure 31:
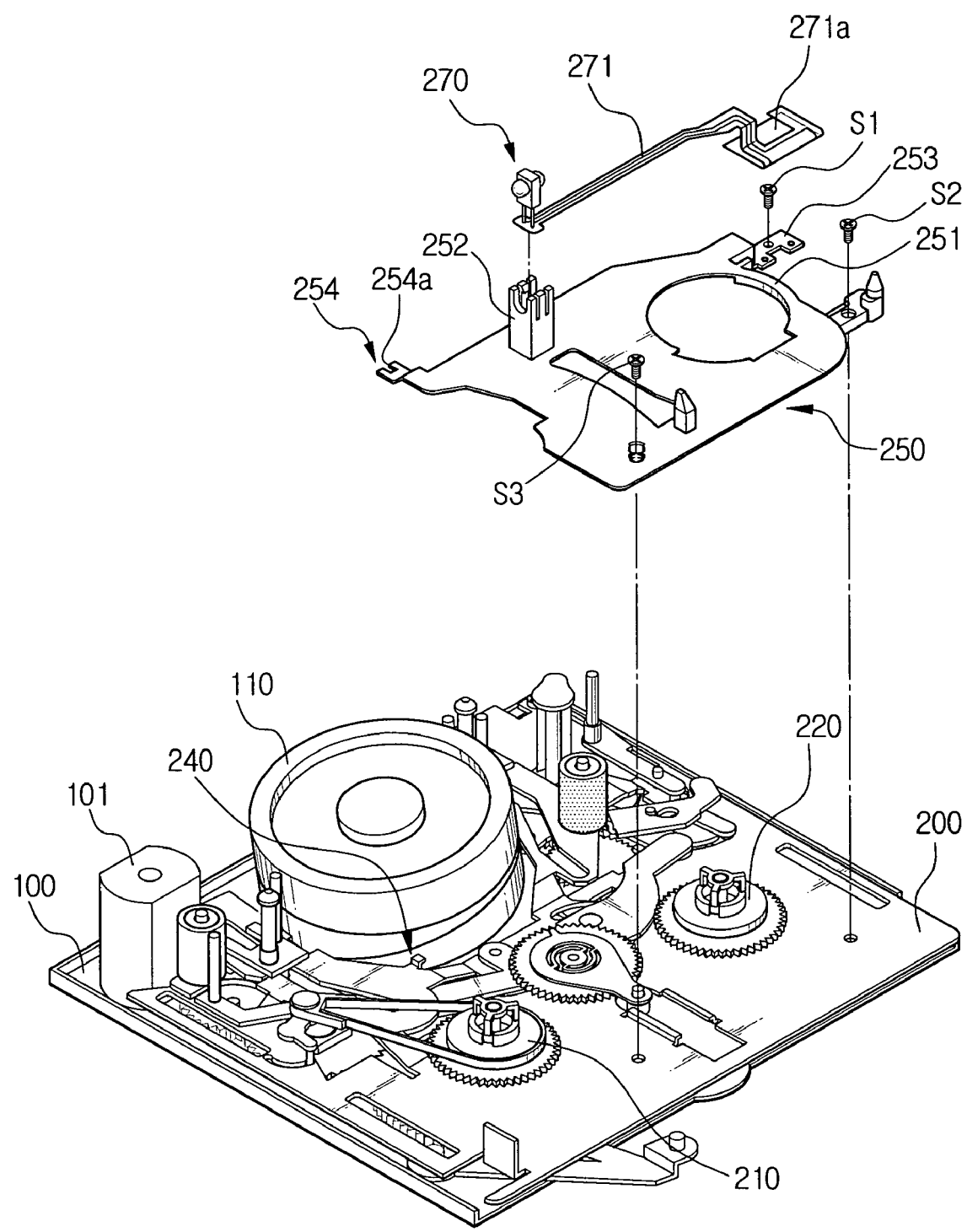
FIG. 31 is a schematic exploded view for illustrating a reel cover connecting apparatus of a magnetic recording/reproducing apparatus according to another embodiment of the present invention.

Meanwhile, the reel cover connection apparatus according to another embodiment of the present invention is now described with reference to FIG. 31. Referring to FIG. 31, the reel cover connection comprises a supporting holder 240 provided in the sub-deck 200 and a holding section 254 provided in the reel cover 250.

Figure 32:
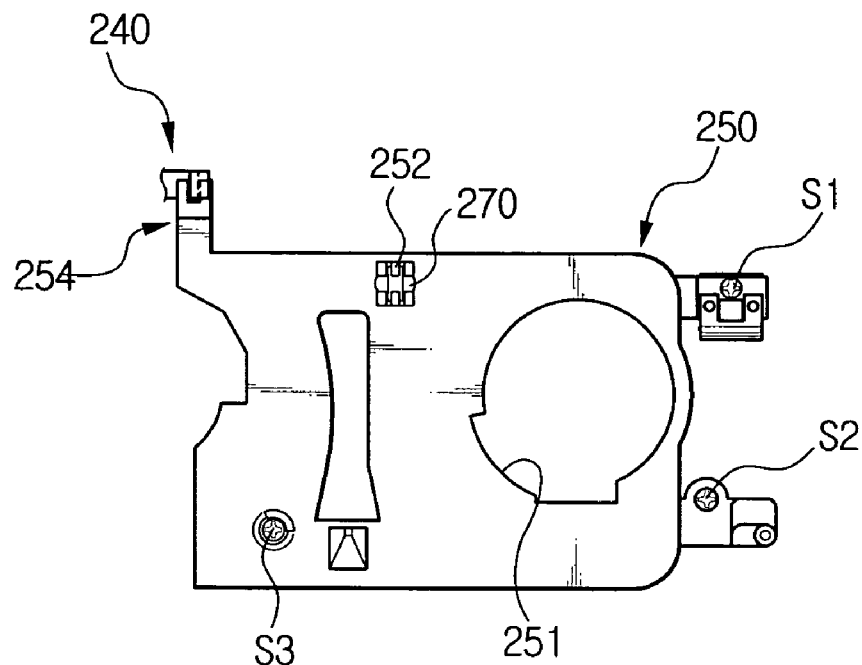
FIG. 32 is a schematic top plan view of the reel cover shown in FIG. 31.
Figure 33:
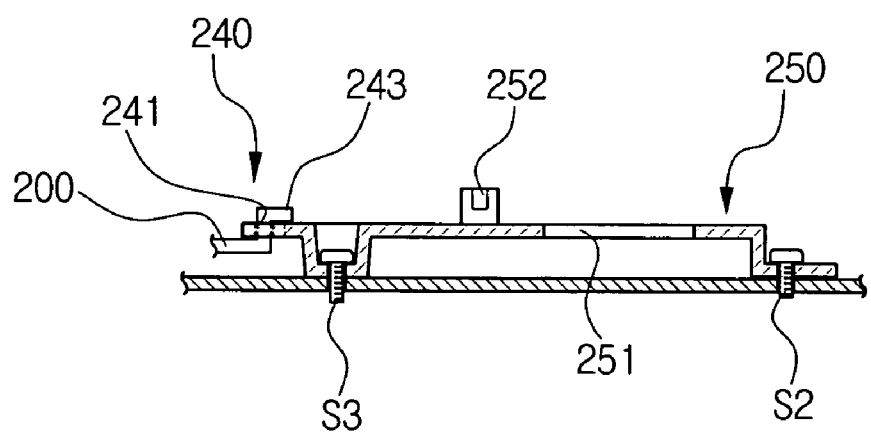
FIG. 33 is a cross-sectional view showing the state in which the reel cover shown in FIG. 31 is connected to the sub-deck.

As shown in FIGS. 32 and 33, the supporting holder 240 comprises an upright part 241 formed by cutting and upwardly bending a part of the sub-deck 200, and a horizontal part 243 formed by continuously bending the upright part 241 in the horizontal direction. That is, the supporting holder 240 has a "Z" shape.

The reel cover 250 has an opening 251 for exposing the reel disc 220 and may have an end sensor holder 252 for supporting tape end sensor 270. The tape end sensor 270 is provided for sensing the end of the magnetic tape unwound from or wound into the tape cassette. The tape end sensor 270 is connected to a circuit section (not shown) on the sub-deck 270 through an FPC 271. For this purpose, one end 253 of the reel cover 250 for supporting the contact 271a of the FPC 271 is fixed on the sub deck 200 by a screw S1.

In addition, the reel cover 250 is connected to the sub-deck 200 by screws S2, S3 at two different positions. That is, in this embodiment, the reel cover 250 is fixed to the sub-deck 200 by the screws S1, S2 and S3 at three positions.

The holding section 254 provided in the reel cover 250 is connected and fixed to the sub-deck 200 by a so-called fitting method without using a screw. Such a holding section 254 is provided with a 'U' shaped fitting groove 254a. By fitting the fitting groove 254a onto the upright part 241, the horizontal position of the reel cover 250 is fixed and the horizontal part 243 fixes the vertical position of the reel cover 250. Therefore, the reel cover 250 is capable of being fixed to the sub-deck 200 even in the state in which three screws are removed from four screws conventionally used for that purpose. Therefore, a cost saving effect can be envisaged due to reducing the numbers of parts and assembling steps.

Figure 34:
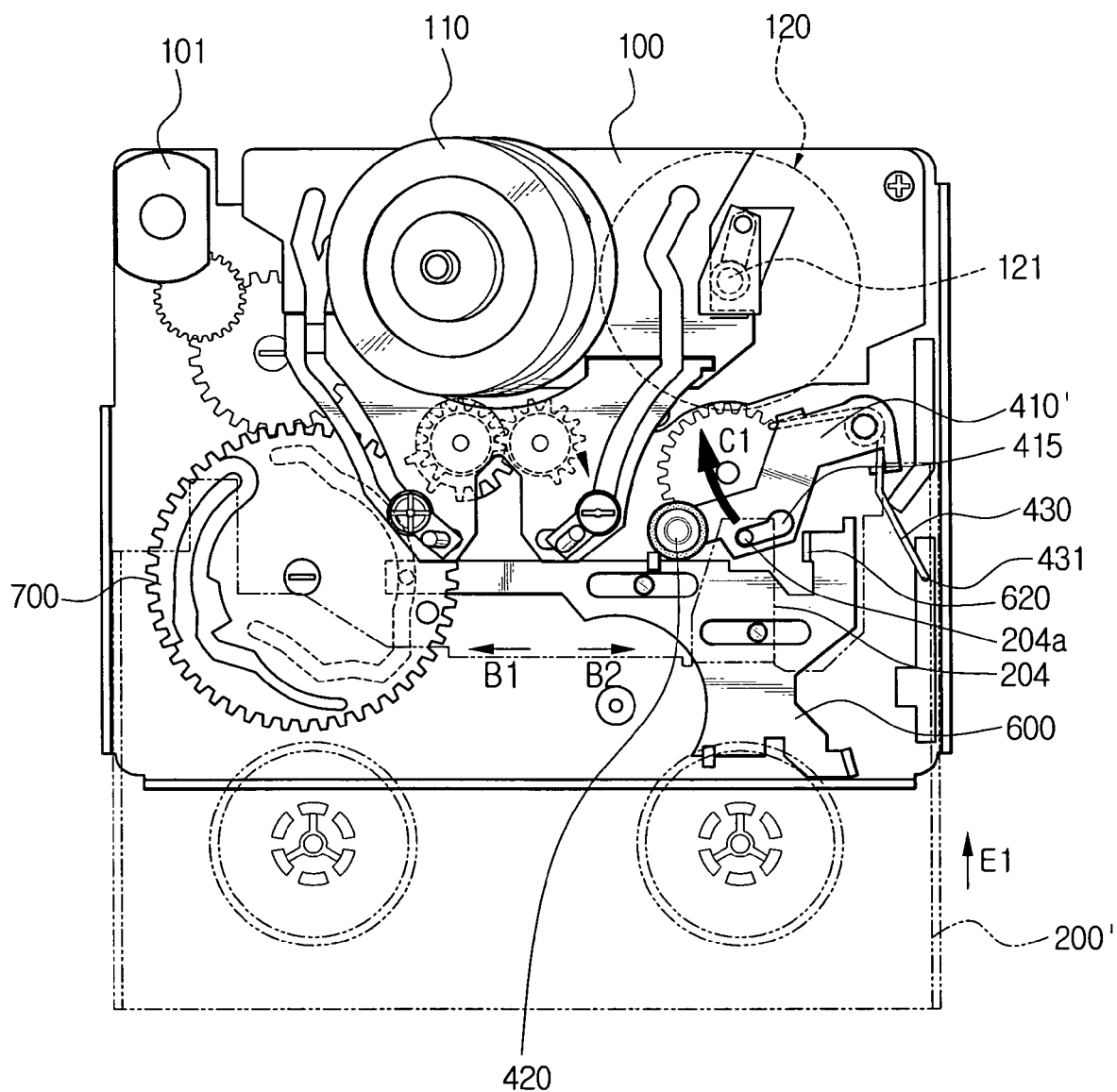
FIG. 34 is a top plan view for illustrating the pinch roller driving mechanism of a magnetic recording/reproducing apparatus according to another embodiment of the present invention.
Figure 35:
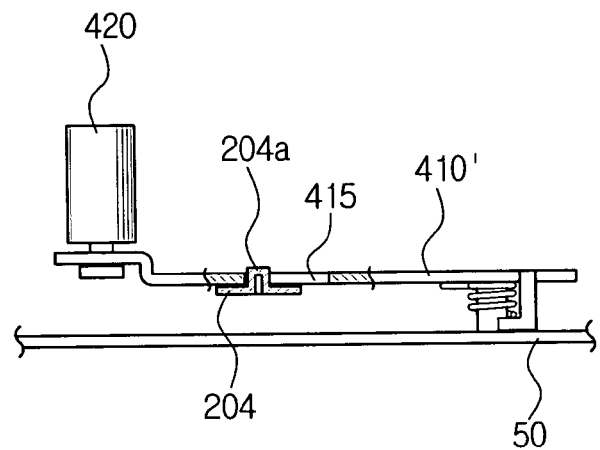
FIG. 35 is a cross-sectional view showing the main part of FIG. 34.
Figure 36:
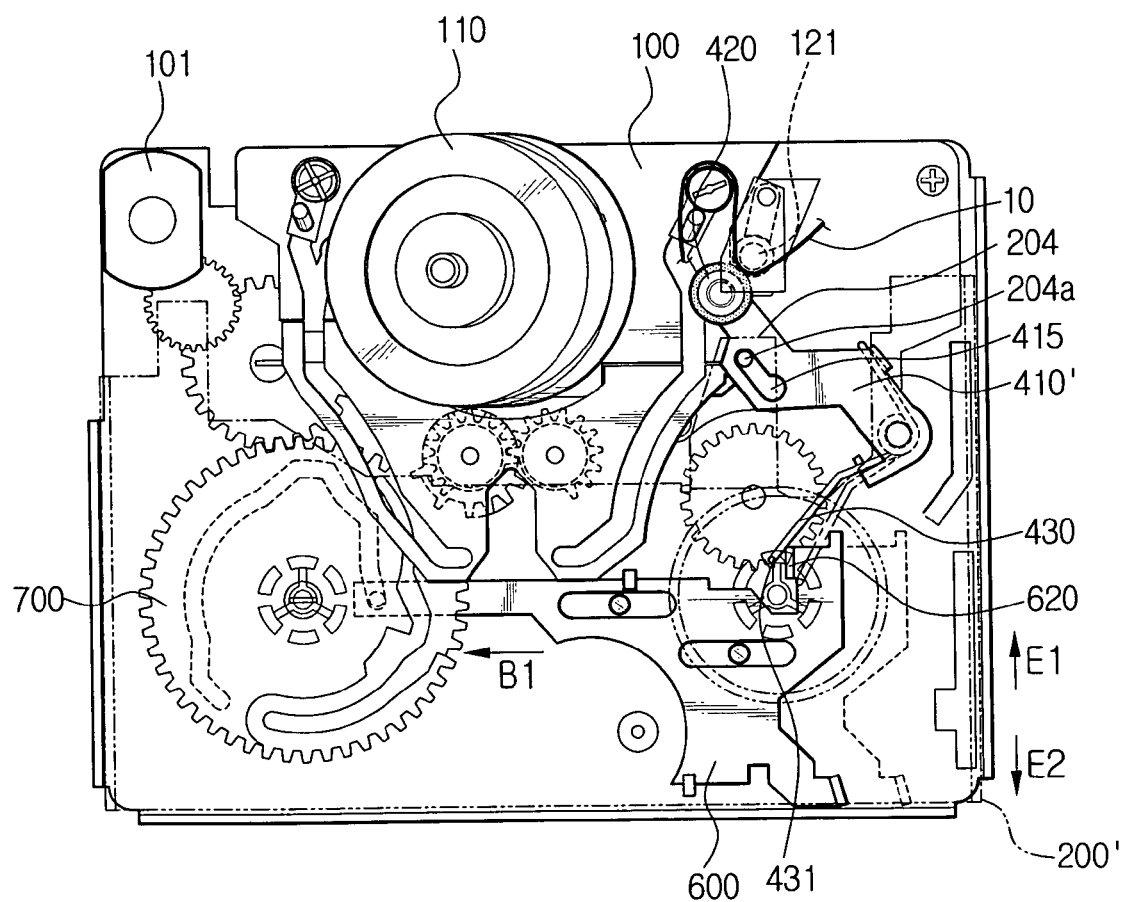
FIG. 36 is a top plan view showing the state in which the sub-deck is being loaded from the state shown in FIG. 34.

In addition, the pinch roller driving mechanism according to another embodiment of the present invention is described with reference to FIGS. 34, 35 and 36. For the components identical to those shown in the drawings previously described, like reference numerals are allocated, and detailed description is omitted.

Referring to the drawings, the pinch roller driving mechanism comprises a sub-deck 200' in a main deck 100 to be loaded/unloaded, a pivot lever 410' for supporting a pinch roller 420, which is installed on the main deck 100 and moves a magnetic tape 10 to come into close contact with a capstan spindle 121. A torsion spring 430 is coaxially installed on the pivot lever 410'. Here, the pivot lever 410' is formed with a cam slot 415 in a predetermined shape with a predetermined length. A cam projection 204a inserted into the cam slot 415 is formed on the top surface of a tip end compression section 204 of the sub-deck 200. The cam projection 204a can be formed by burring the compression section 204 in such a way that the bottom of the compression section 204 is to be projected upwardly. Therefore, as the cam projection 204a and the cam slot 415 is linked at the time of loading the sub-deck 200', the pivot lever 410' is concurrently rotated. Also, as the cam projection 204a and the cam slot 254a are also linked at the time of unloading the sub-deck 200, the pivot lever 410' is automatically returned. Therefore, the return spring 440 shown in FIG. 12 is not needed, whereby the number of parts can be reduced.

The operation of the pinch roller driving mechanism with the afore-mentioned construction is now briefly described. Firstly, the sub-deck 200' is loaded in the direction E1 from the state shown in FIG. 34 by the rotation of the main cam gear 700. Then, the pivot lever 410' linked to the cam projection 204a of the sub-deck 200' is rotated in the direction C1. At this time, the torsion spring 430 is also rotated therewith. Then, as shown in FIG. 36, the pinch roller 420 is contacted with the capstan spindle 121 with the magnetic tape 10 being sandwiched therebetween. And, the bent part 431 of the torsion spring 430 is positioned at the left side of the compression projection 620 of the main sliding member 600.

From this state, the main sliding member moves in the direction B1 due to the rotation of the main cam gear 700. Then, the compression projection 620 compresses the bent part 431 of the torsion spring 430. Accordingly, the torsion spring 430 is additionally compressed, and the pinch roller 420 is more closely contacted against the capstan spindle 121 by the compression force.

In addition, if the sub-deck 200' is loaded in the direction E2 from the above state, the torsion spring 430 is firstly released from the compression projection 620 of the main sliding member 600. Next, the pivot lever 410' is pivoted by being linked to the movement of the sub-deck 200' and returns to the position shown in FIG. 34.

Hereinbelow, description is made for a tape unwinding prevention apparatus according to another embodiment of the present invention. The tape unwinding prevention apparatus according to the present embodiment functions to provide rotational load to the supply side reel disc 210, thereby preventing the unwinding phenomenon of the magnetic tape. Description is made firstly for the construction of the tape unwinding prevention apparatus and then for the operation for providing rotational load to the supply side reel disc 210. For the components same with those shown in the previously described drawing, like referential numerals are allocated and detailed description is omitted.

Figure 37:
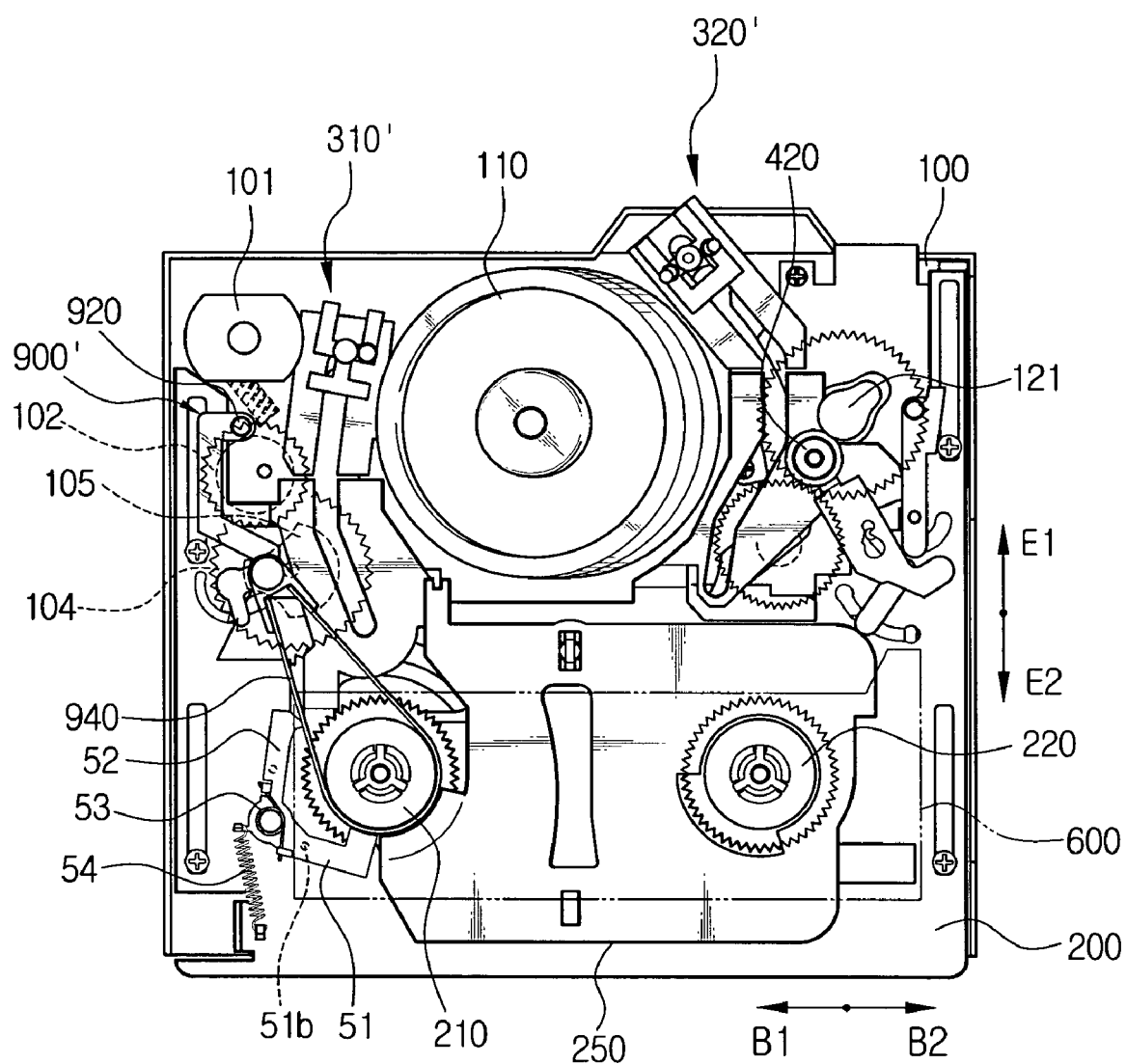
FIG. 37 is a top plan view showing a tape unwinding prevention apparatus of a magnetic recording/reproducing apparatus according to another embodiment of the present invention.

Referring to FIG. 37, the main deck 100 is provided with a head drum 110 and a driving motor 101. The power of the driving motor 101 is transmitted to a main cam gear (not shown) via a reduction gear (not shown), a link gear 102, and a mode switch gear 104.

Figure 38A:
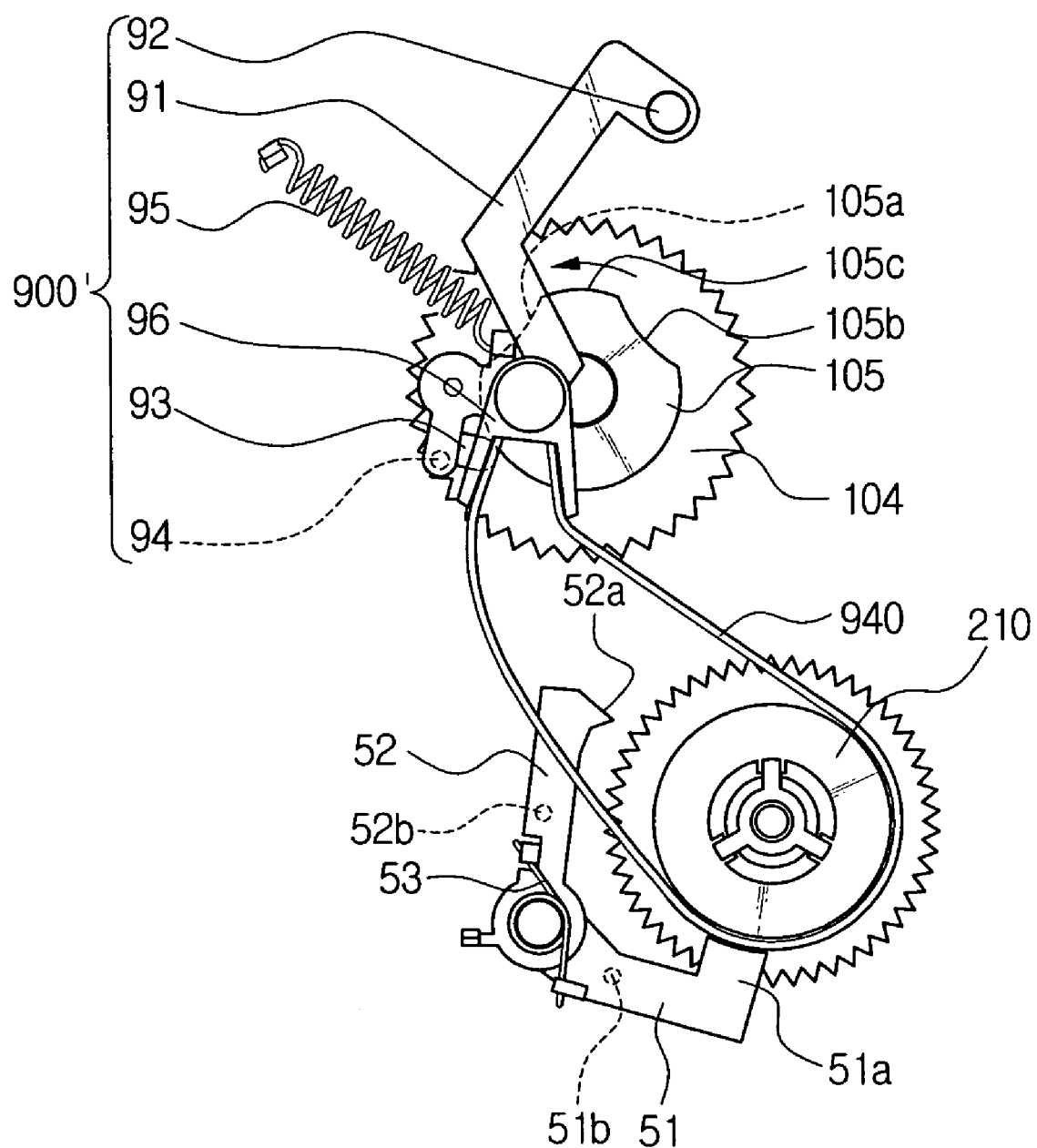
FIGS. 38A to 38D are schematic top plan views for illustrating the operation of the tape unwinding prevention apparatus shown in FIG. 37.

The mode switch gear 104 comprises a mode switch (not shown) on its rear surface, in which the mode switch controls a mode signal of each operation mode for predetermined operation modes. Thereby, the tape record is adapted to sequentially operate according to the predetermined operation modes. As shown in FIG. 38A, the mode switch 104 is provided with a cam member 105 on a side, in which the cam member is formed to have different radii along the circumference. The cam member 105 is provided with two indentations, which are important components in the present invention. The construction and role of the cam will be described later.

A supply side reel disc 210 and a take-up side reel disc 220 are installed on the sub-deck 200. The supply side reel disc 210 supports a supply side hub of a cassette, i.e., the part where non-reproduced/non-recorded tape is wound.

In addition, the sub-deck 200 is provided with a tension pole assembly 900' and means for supplying rotation load.

Figure 38B:
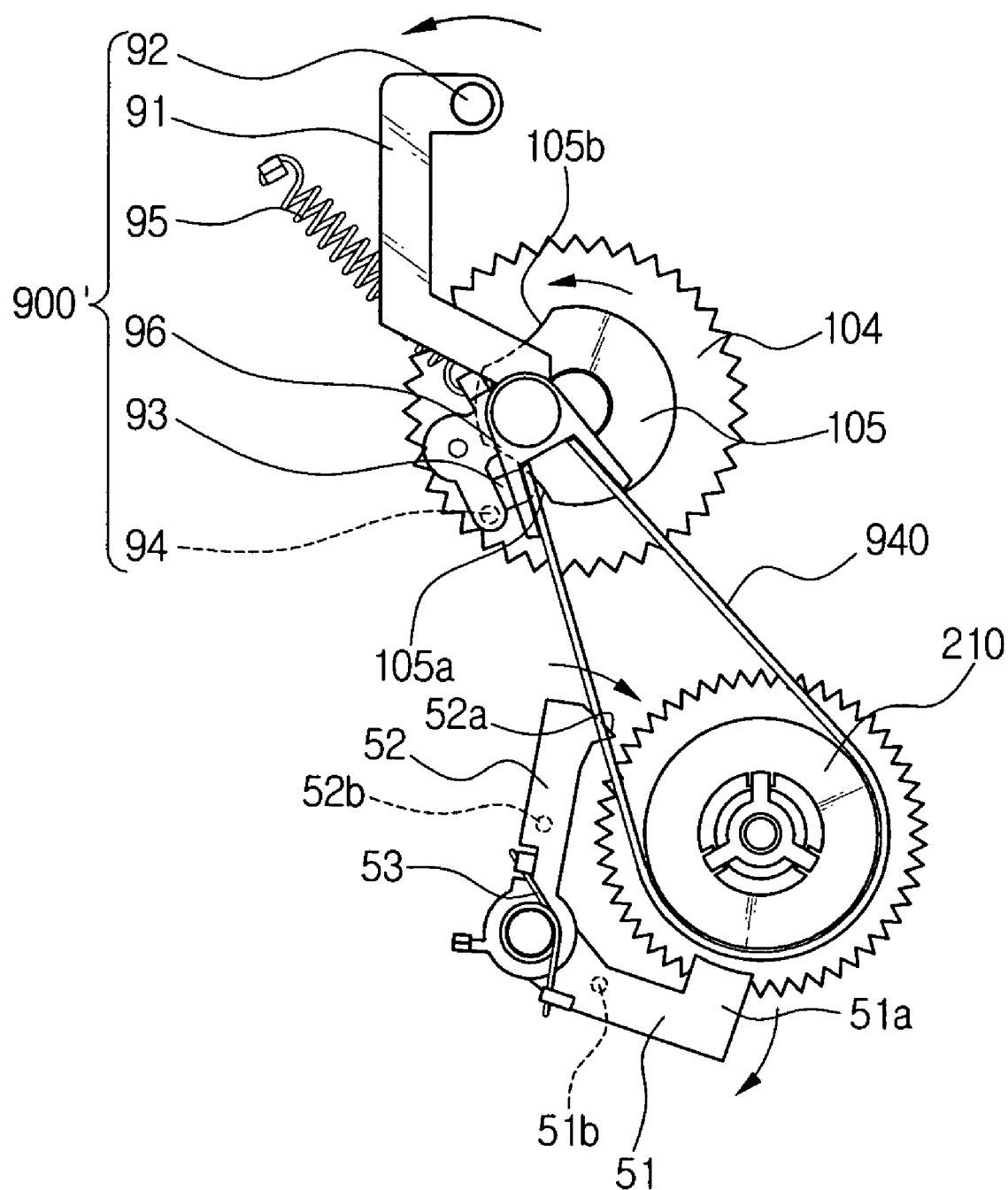
Figure 38C:
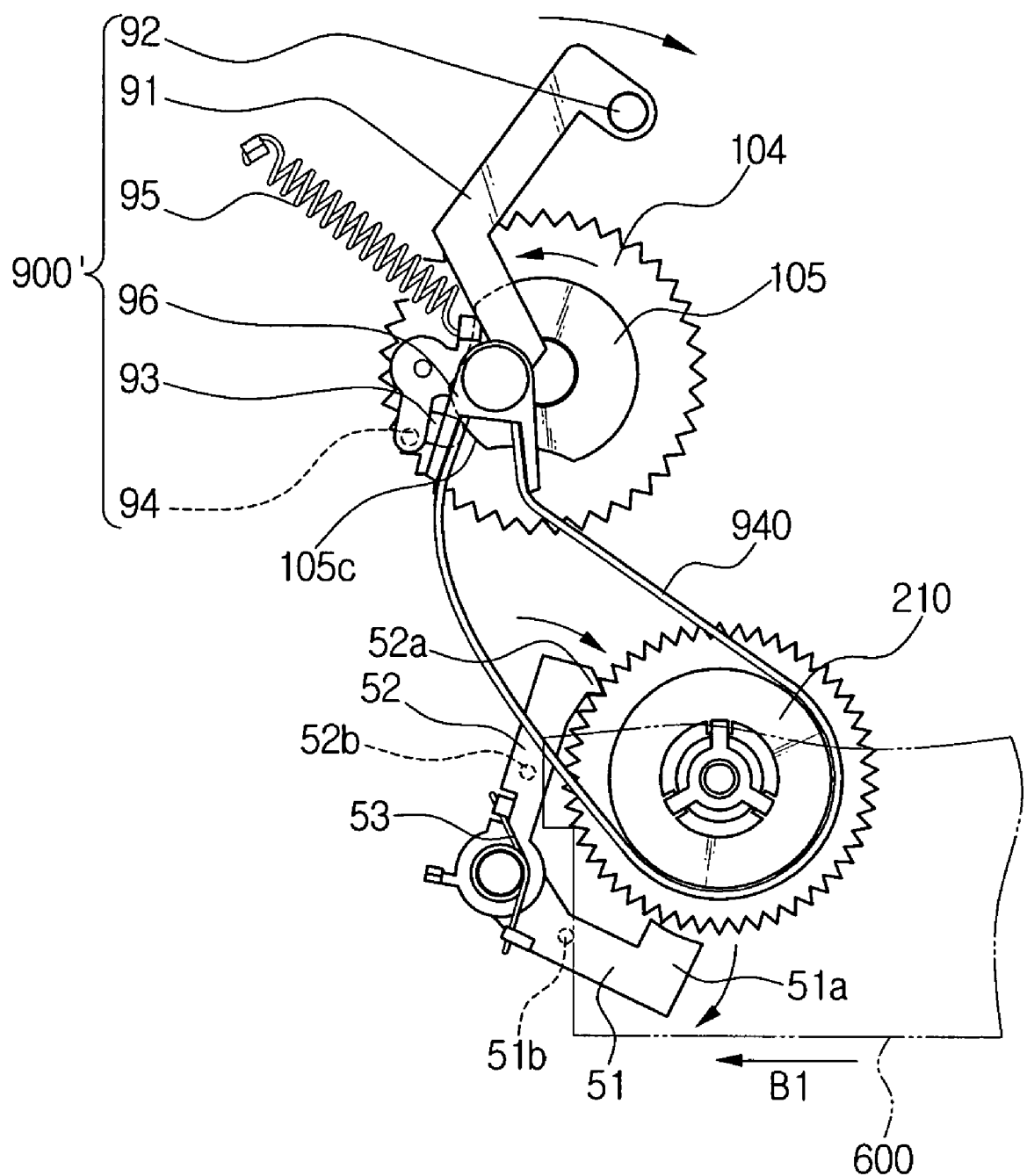
Figure 38D:
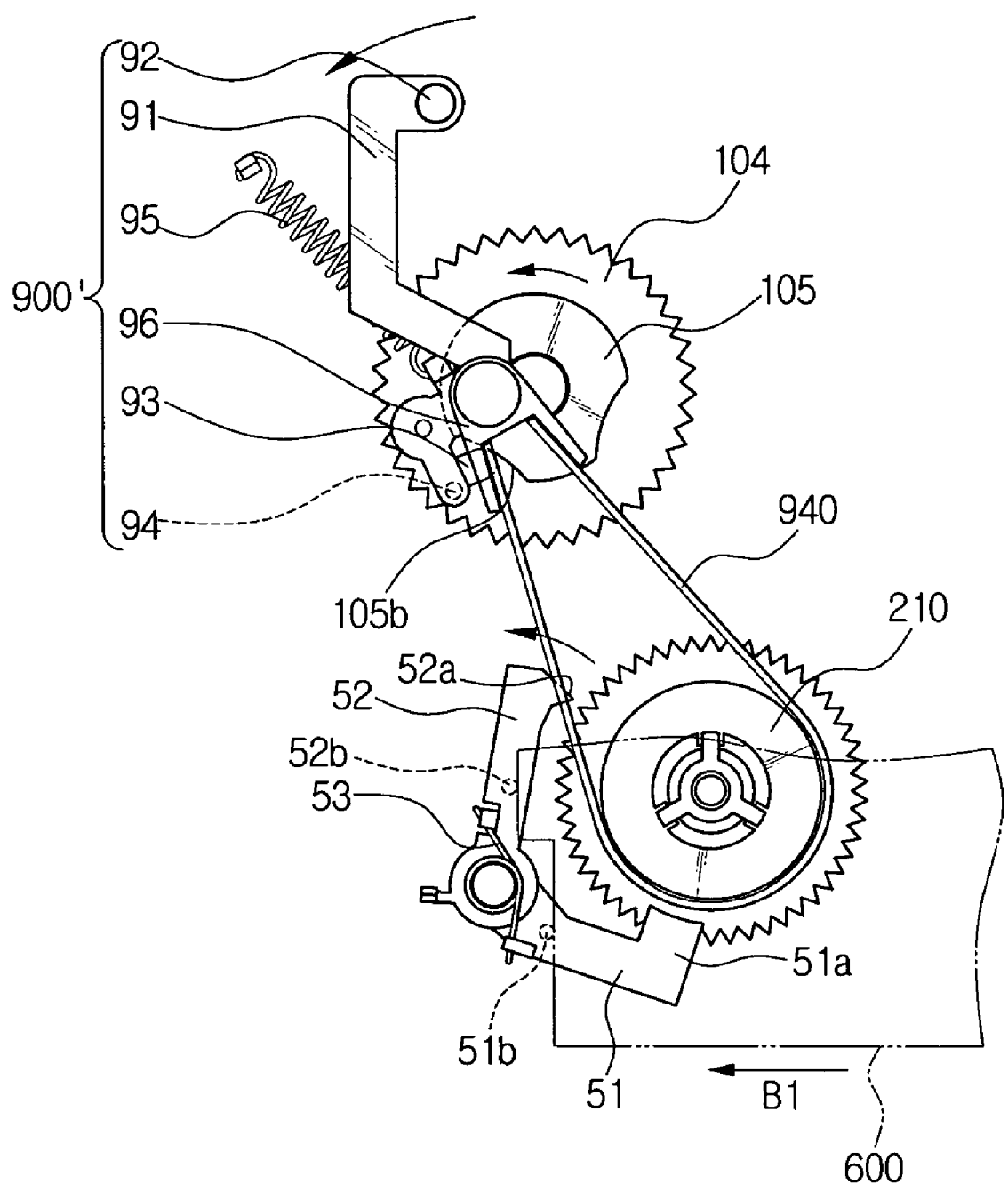

FIGS. 38A–38D are top plan views showing the operation mode switch 104, the tension pole assembly 900', the brake band 940, the sub brake 51, the lever brake 52, and the supply side reel disc 210 according to the operation modes of a tape recorder. FIG. 38A illustrates the step of sub-loading mode. FIG. 38B illustrates the step between sub-loading mode and stop mode. FIG. 38C illustrates the step of stop mode. FIG. 38D illustrates the step of playback mode.

As shown in FIG. 38A, the cam member 105 is formed on a side of the mode switch gear 104. The cam member 105 is provided with a first indentation 105a and a second indentation 105b. The peak of the projection 105c preferably has a radius identical to that of the remaining part exclusive of the first indentation 105a and the second indentation 105b.

The tension pole assembly 900' comprises a tension arm 91, a tension pole 92, a link part 93, a guide pin 94 and a spring 95.

The tension pole 92 is uprightly provided at an end of the tension arm 91, and the tension arm 91 is rotatably installed on the sub-deck 200. The link part 93 is formed on a side of the tension arm 91 to define the rotation range of the tension arm 91 by being contacted with the cam member 105 of the mode switch gear 104. The guide pin 94 and the spring 95 perform functions same with the guide pin 912 and the spring 930 shown in FIG. 18.

The means for supplying rotation load to the supply side reel disc 210 comprises the sub-brake 51, the lever brake 52 and the brake band 940.

One end of the sub-brake 51 is formed with a braking part 51a projected therefrom for compressing a side of the reel disc 210 with a brake band 940 being sandwiched between the sub-brake 220 and the braking part 51a, and the other end is connected to a tension spring 54 installed on the sub-deck 200. Thereby, the sub-brake 51 is capable of being pivoted on the sub-deck 200 and the braking part 51a compresses the reel disc 210 due to the restoring force of the tension spring 54. Due to this compressing force, the reel disc 210 is provided with predetermined rotation load.

Here, if the main sliding member 600 is slid in the direction B1 as shown in FIG. 37, the main sliding member 600 comes into contact with and pushes the projection 51b formed on the braking part 51a and projected downwardly. Then, the sub-brake 51 is pivoted clockwise and the braking part 51a is spaced from the reel disc 210, whereby the rotation load acting on the reel disc 210 is released.

The lever brake 52 is pivotably installed on the sub-deck 200 coaxial to the sub-brake 51. The end of the lever brake 52 is provided with a projection 52a. In addition, the rotational center of the brakes 51, 52 is provided with a torsion spring 53, and the opposite ends of the torsion spring 53 are resiliently supported by the brakes 51, 52. Therefore, the elastic restoring force of the torsion spring 53 is generated in link with the release operation of the sub-brake 51, the lever brake 52 is compressed by the elastic restoring force, and the projection 52a comes into contact with a valley part of the gear train of the reel disc 210, whereby the reel disc 210 is provided with rotation load.

The lever brake 52 is provided with a projection 52a projected from the bottom surface thereof. Therefore, if the main sliding member 600 moves in the direction B1, interferes with the sub-brake 51 and then further moves, the main sliding member 600 comes into contact with the projection 52b. Then, the lever brake 52a is pivoted counterclockwise, so that the projection 52a is spaced from the reel disc 210 and the rotation load acting on the reel disc 210 is released.

The brake band 940 is installed to wind around a part of the external circumference of the reel disc 210 and the opposite ends of the brake band 940 are connected to a band holder 96 provided on the tension arm 91. If the tension arm 91 rotates counterclockwise, tension is generated in the brake band 940 and the brake band 940 winds around and contacts with the reel disc 210. As the brake band 940 contacts with the reel disc 210 in this manner, the reel disc 210 is provided with rotation load. On the contrary, if the tension arm 910 rotates clockwise, the rotation load acting on the brake band 940 is released and the brake band 940 is spaced from the reel disc 210.

Figure 39:
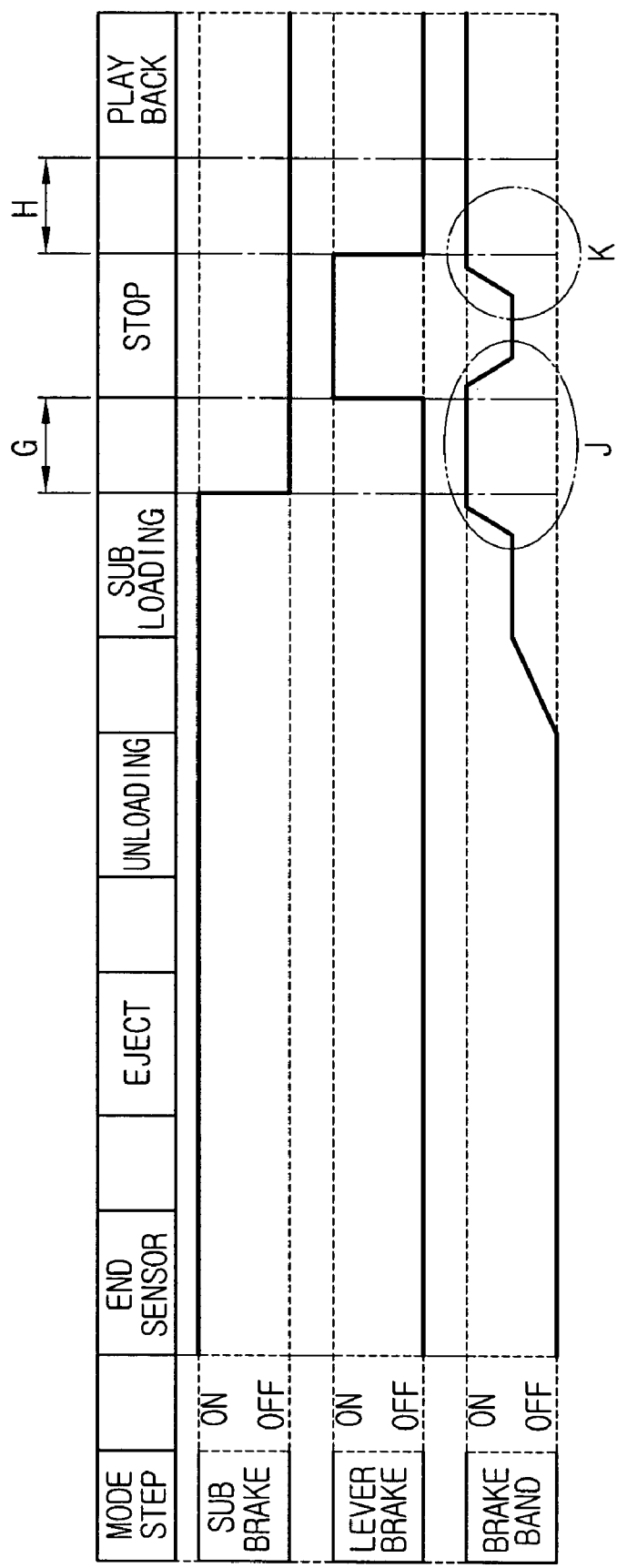
FIG. 39 is a graph showing the mode proceeding the state of the tape recorder using the tape unwinding prevention apparatus according to an embodiment of the present invention.

FIG. 39 shows the operating conditions of the sub-brake 51, the lever brake 52 and the brake band 940 in steps of end sensor mode, eject mode, unloading mode, loading mode, stop mode, playback mode by a graph.

Hereinbelow, the operation of the tape unwinding prevention apparatus having the construction as described above is described together with respective mode steps.

Referring to FIG. 37, the end sensor mode is an operation mode, in which the sub-deck 200 is spaced from the main deck 100 in the direction F2, and the non-magnetic surface provided at the tail end of a tape housed in a cassette tape is detected in the state where a housing (not shown) is opened, thereby enabling the tape loading.

The eject mode is an operation mode in which the tape cassette is capable of being discharged.

The unloading mode is an operation mode in which the tape is not contacted with the head drum 110 and the housing is seated on the sub-deck 200 in the state where the cassette tape is inserted into the housing.

The sub-loading mode is an operation mode, in which the sub-deck is slid in the direction E1 by the driving motor 101 and docks with the main deck 100, the pole base assemblies 310' 320' are loaded first, and the main sliding member 600 is slid in the direction B1, whereby the pinch roller 420 comes into close contact with the capstan spindle 121.

In the end sensor mode to sub-loading mode, the sub-brake 51 compresses a side of the reel disc 210 with the brake band 940 being sandwiched therebetween, whereby the reel disc 210 is provided with predetermined rotation load. This operation condition is illustrated in graph of FIG. 39.

In particular, in the sub-loading mode, the link part 93 of the tension pole assembly 900' contacts with a counterclockwise lateral side of the position provided with the first indentation 105a of the cam member 105 of the mode switch gear 104, as shown in FIG. 38A. Accordingly, as shown in FIG. 39, the brake band 940 is not positioned under the "ON state", which indicates complete braking state. However, as described above, because the sub-brake 51 supplies rotation load to the reel disc 210, the excessive unwinding of the tape can be prevented.

The stop mode is an operation mode, in which the picture during reproduction is stopped and the pinch roller 420 is spaced from the capstan spindle 121. At this time, the main sliding member 600 moves in the direction B1 while being contacted with the sub-brake 51, whereby the brake action of the sub-brake 51 is released. And, as the projection 52a of the lever brake 52 is contacted with the reel disc 210 by the elastic force of the torsion spring 53, thereby applying braking force to the reel disc 210, the excessive unwinding of the tape can be prevented. At this time, as shown in FIG. 38C, the link part 93 of the tension pole assembly 900' comes into contact with the projection 105c of the cam member 105. Accordingly, the tension arm 91 moves clockwise, and the tension of the brake band 940 is loosened. Therefore, as shown in FIG. 39, the brake band 940 is not positioned in the "ON state." However, in this case, the excessive unwinding of the tape can also be prevented because the lever brake 52 supplies rotation load to the reel disc 210.

In the G section of FIG. 39, which is between the sub-loading mode and the stop mode, the sub-brake 51 is released, whereas the lever brake 52 linked with the sub-brake 41 starts to selectively operate. Therefore, both of the sub-brake 51 and the lever brake 52 sometimes do not supply rotation load to the reel disc.

At this time, as shown in FIG. 38B, the link part 93 of the tension pole assembly 900' comes into contact with the first indentation 105a of the cam member 105. Therefore, the tension arm 91 rotates counterclockwise, and the tension of the brake band 940 increases. Then, the brake band 940 comes into strong contact with the reel disc 210 and the J section, in which the brake band 940 is positioned in the "ON state", appears in the graph as shown in FIG. 39. Thereby, predetermined rotational load is applied to the reel disc 210. As a result, the tape taken out from the cassette is provided with the predetermined tension, whereby the excessive unwinding can be prevented. Of course, if the tension pole assembly 900' pivots counterclockwise, the tension pole 92 also moves in the same direction and provides tension, the tape unwinding prevention effect can be further enhanced.

The playback mode is an operation mode in which the tape runs while the pinch roller 420 is compressed against the capstan spindle 121. At this time, the lever brake 52 is spaced from the reel disc 210, whereby the rotation load of the reel disc 210 is released. In addition, as shown in FIG. 38D, before the braking force of the lever brake 52 is released, the link part 93 of the tension pole assembly 900' comes into contact with the second indentation 105b of the cam member 105. Here, the point of time at which the link part 93 comes into contact with the second indentation 105b should be prior to the point at which the lever brake 52 release the rotation load from the reel disc 210. As such, the starting place of the second indentation is appropriately determined and formed.

Next, as the link part 93 comes into contact with the second indentation 105*b*, the tension arm 91 pivots counterclockwise and tension is generated in the brake band 940. Therefore, as shown in FIG. 39, the K section, in which the brake band 940 operates in "ON state," appears in the graph before the lever brake 52 is released. Thereby, the reel disc 210 is provided with predetermined rotation load, and predetermined tension is applied to the magnetic tape taken out from the cassette. Accordingly, it is possible to obtain an effect for preventing the excessive unwinding of the tape.

As described above, with the tape unwinding prevention apparatus according to embodiments of the present invention, rotation load equal to or exceeding a predetermined level is continuously applied to the supply side reel disc 210 at the time of switching an operation mode, whereby the tension of the tape can be maintained at a predetermined level or more. Therefore, the unwinding and deviation of the tape can be prevented and the running ability can be enhanced.

Figure 40:
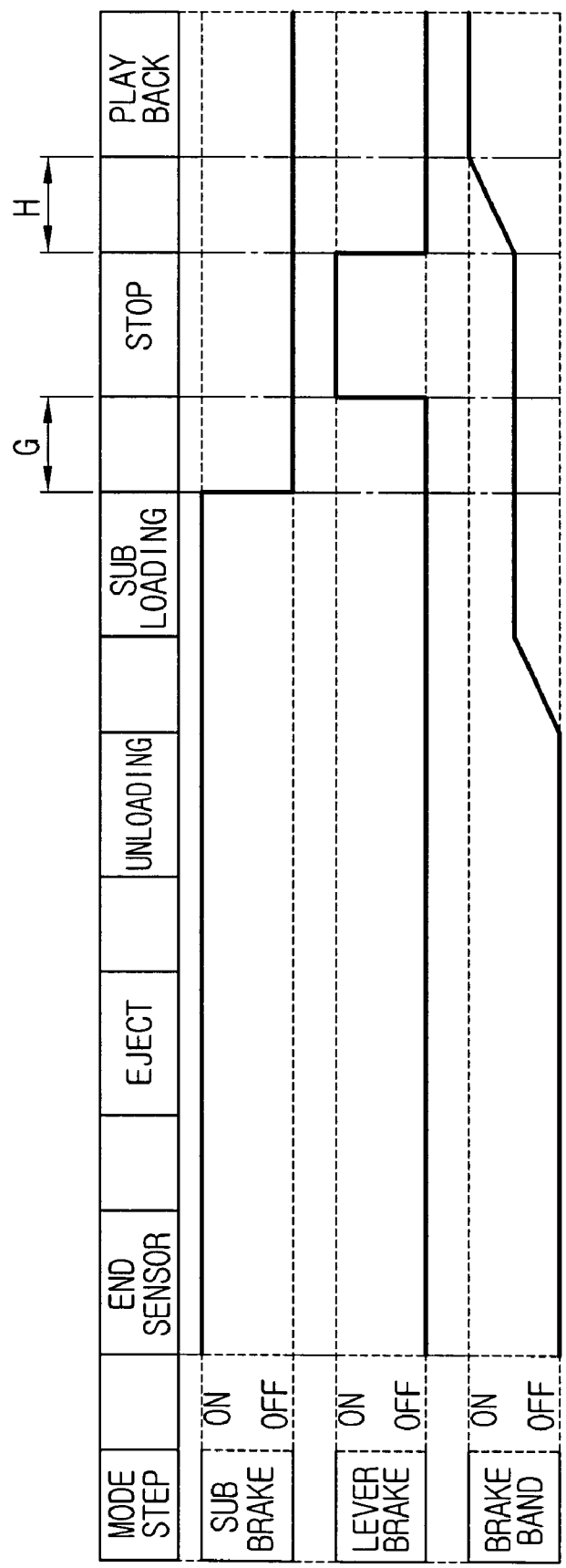
FIG. 40 is a graph showing the conventional mode proceeding the state for comparison with the operation of the tape unwinding prevention apparatus according to an embodiment of the present invention.

More specifically, comparison is made between FIG. 39 illustrating the operation of the brake band 940, which employs the cam member 105 formed with respective indentations 105*a*, 105*b*, and FIG. 40 illustrating the operation of the brake band 940, which employs a conventional cam member (no indentation is provided). In FIG. 49 illustrating the conventional operation modes, there is no section in which the "ON state" of the brake band 940 appears during the operation modes are switched from the sub-loading mode to the stop mode and to playback mode. Therefore, the G section and H section, in which no rotation load applies to the reel disc, are produced. To the contrary, according to embodiments of the present invention, when the operation modes are switched, the brake band 940 temporarily maintains the "ON state," whereby rotation load can be continuously applied to the reel disc 210.

While the present invention has been shown and described with reference to the preferred embodiments thereof, the present invention is not limited to the embodiments. It will be understood that various modifications and changes can be made by those skilled in the art without departing from the spirit and scope of the invention as defined by the appended claims. It shall be considered that such modifications, changes and equivalents thereof are all included within the scope of the present invention.

What is claimed is:

1. A deck mechanism for a magnetic recording/reproducing apparatus, comprising:
   a main deck provided with a head drum and a capstan motor;
   a sub-deck installed on the main deck to be loaded/unloaded, the sub-deck being provided with a pair of reel discs, onto which tape reels of a tape cassette are seated, respectively;
   a pole base loading unit for taking out and guiding a tape to be in contact with a side of the head drum when the sub-deck is loaded, the pole base loading unit further comprising:
      a pair of pole base assemblies mounted to be capable of reciprocating on the main deck, the pole base assemblies moving the tape as it is being loaded to come into contact with the head drum;
      a guide rail provided on a rail plate mounted on the main deck, for guiding movement of the pole base assemblies;
      a pair of loading gears mounted on the rail plate to be capable of being rotated, the loading gears being engaged with each other and connected to a main cam gear, wherein the loading gears comprise:
         a first loading gear fitted on the bottom side of the rail plate to be capable of being rotated; and
         a second loading gear fitted on the rail plate and provided with a small gear section engaged with the first loading gear and a large gear section connected to the main cam gear; and
      a pair of link units for linking the loading gears to the pole base assemblies, respectively;
   a pinch roller unit for compressing the tape against a spindle of the capstan motor when the sub-deck is loaded;
   a brake unit for selectively braking one of the reel discs;
   a main sliding member mounted on the main deck to be capable of reciprocatingly sliding, the main sliding member controlling the driving of the pinch roller unit; and
   the main cam gear mounted on the main deck to be capable of rotating, the main cam gear allowing all of the sub-deck, the pole base loading unit, the brake unit, and the main sliding member to perform linked movements while the main cam gear is rotationally driven.

2. The deck mechanism according to claim 1, wherein the large gear section is formed in a position lower than the small gear section, so that a step is formed therebetween, and the large gear section has a radius larger than that of the small gear section.

3. The deck mechanism according to claim 1, wherein the large gear section is provided in such a manner that gear teeth are projected only from a predetermined area on the circumference of the second loading gear, whereby the large gear section is engaged with the main cam gear only in the predetermined area.

4. The deck mechanism according to claim 3, wherein a pair of large gear valleys, which are relatively deep as compared to neighboring gear valleys, are formed in the large gear section, the large gear valleys respectively positioned at the opposite ends of the larger gear section, respectively, to start engagement with the main cam gear according to the rotating directions of the main cam gear, and a pair of large teeth, which are relatively highly projected as compared to neighboring gear teeth, are formed in the main cam gear, the large gear teeth positioned to correspond to the large gear valleys.

5. The deck mechanism according to claim 4, wherein the large gear teeth are formed in a position lower than the other gear teeth formed all over the circumference of the main cam gear.

6. The deck mechanism according to claim 3, wherein the main cam gear comprises:
   a main gear part formed all over the circumference to receive power;
   a connection gear part formed in a position lower than the main gear part to be connected with the gear teeth of the large gear section;
   a pair of large gear teeth respectively formed in the leading and trailing parts of the connection gear part to be larger than the remaining gear teeth of the connection gear part; and
   a sliding wing portion formed to be projected in a circular arc shape of a predetermined length in a place laid out from the connection gear part and the large gear teeth and lower than the main gear part, the sliding wing portion slidably contacted with the circumference of the large gear section.

7. The deck mechanism according to claim 1, wherein the pinch roller unit comprises:
   a pivot lever rotatably mounted on the main deck and rotated toward the spindle of the capstan motor in cooperation with the sub-deck as being loaded;
   a pinch roller rotatably mounted on one end of the pivot lever and coming into close contact with the spindle of the capstan motor; and
   a torsion spring mounted on the pivot lever, the torsion spring being pushed and compressed by the sliding member, thereby urging the pivot lever firstly pushed by the sub-deck against the spindle of the capstan motor.

8. The deck mechanism according to claim 7, wherein one end of the torsion spring is downwardly bent toward the main sliding member side, and a compression projection is upwardly projected from the main sliding member to come into contact with and compress the one end of the torsion spring.

9. The deck mechanism according to claim 7, wherein, when the torsion spring is loaded along with the pivot lever, the main sliding member is reciprocated for a predetermined distance one time so that it does not interfere with the movement of the torsion spring.

10. The deck mechanism according to claim 8, wherein, when the loading of the torsion spring is completed, one end of the torsion spring is positioned in the moving area of the compression projection, so that the torsion spring is capable of being contacted with and compressed by the compression projection when the main sliding member moves.

11. The deck mechanism according to claim 1, wherein the main cam gear is formed with a main cam slot in a predetermined length and shape, the main cam slot allowing the main sliding member to be linked thereby controlling the reciprocation movements of the main sliding member.

12. The deck mechanism according to claim 11, wherein the main cam slot is formed on the bottom surface of the main cam gear.

13. The deck mechanism according to claim 1, wherein the brake unit comprises:
   a first brake pivotally installed on the sub-deck, the first brake being contacted with and spaced from the one reel disc;
   a spring for compressing the first brake to be contacted with the one reel disc;
   a second brake installed coaxial to the first brake, the second brake being rotated with the first brake in one direction, in which the first brake is spaced from the one reel disc, and being independently rotated in the other direction opposite to the one direction to come into contact with the one reel disc; and
   a torsion spring for compressing the second brake to be contacted with the one reel disc, wherein each of the first and second brakes is selectively contacted and linked with the main cam gear when the sub-deck is loaded, thereby being separated from/contacted with the one reel disc.

14. The deck mechanism according to claim 13, wherein the first and second brakes are formed with first and second guide pins projected from the bottom sides thereof, respectively, the first and second guide pins being contacted with and guided by the main cam gear.

15. The deck mechanism according to claim 14, wherein the main cam gear is provided with a guide slot for sequentially guiding the first and second guide pins in a predetermined area in the rotational direction of the main cam gear.

16. The deck mechanism according to claim 15, wherein the guide slot is formed in the predetermined area on the top surface of the main cam gear, and the first and second guide pins are sequentially entered in and spaced from the guide slot at the time of loading/unloading the first and second guide pins, thereby being selectively guided.

17. The deck mechanism according to claim 13, wherein the one reel disc is the supply side reel disk that is adjacent to the main cam gear.

18. The deck mechanism according to claim 1, further comprising a reel cover installed on the top side of the sub-deck, for supporting the brake unit.

19. The deck mechanism according to claim 1, wherein the sub-deck is formed with a cam slot in a predetermined shape and the cam slot is capable of cooperating with and moving a projection pin projected from the main cam gear at the time that loads/unloads the main cam gear.

20. The deck mechanism according to claim 1, further comprising a mode switch for sensing various operation modes including the loading/unloading of the sub-deck, the mode switch being adapted to cooperate with the main cam gear.

21. The deck mechanism according to claim 20, wherein the mode switch comprises:
   an elastic brush installed under the main cam gear and provided with a plurality of contact pins; and
   an FPC provided with a mode-sensing pattern in a predetermined shape, in which the elastic brush is contacted with the mode-sensing pattern and the FPC faces the bottom surface of the cam gear.

22. The deck mechanism according to claim 21, wherein the bottom surface of the main cam gear is provided with an accommodation recess for accommodating and supporting the elastic brush.

23. The deck mechanism according to claim 1, wherein the main cam gear comprises:
   a disc-shaped body rotatably installed on the top surface of the main deck;
   gear teeth formed on the circumference of the body in a predetermined shape to cooperate with the pole base loading unit;
   a cam slot formed on the bottom surface of the body and cooperating with the main sliding member to reciprocate the main sliding member;
   a guide slot formed on the top surface of the body and cooperating with the brake unit to drive the brake unit; and
   a projection pin projected from the top surface of the body and cooperating with the sub-deck to load/unload the sub-deck.

* * * * *

UNITED STATES PATENT AND TRADEMARK OFFICE
CERTIFICATE OF CORRECTION

| | | |
|---|---|---|
| PATENT NO. | : 7,092,201 B2 | Page 1 of 1 |
| APPLICATION NO. | : 10/661559 | |
| DATED | : August 15, 2006 | |
| INVENTOR(S) | : Choi et al. | |

It is certified that error appears in the above-identified patent and that said Letters Patent is hereby corrected as shown below:

Title Page and Column 1, line 4

The last word of the title on the face of the issued patent is misspelled. The last word of the tile should be changed from "MEMBER" to --MEMBER--.

Signed and Sealed this

Third Day of October, 2006

JON W. DUDAS
*Director of the United States Patent and Trademark Office*